(12) United States Patent
Fujita et al.

(10) Patent No.: US 12,554,187 B2
(45) Date of Patent: Feb. 17, 2026

(54) ILLUMINATION DEVICE AND IMAGE PROJECTION APPARATUS

(71) Applicants: Kazuhiro Fujita, Tokyo (JP); Takashi Sasaki, Kanagawa (JP); Momotaro Yoshida, Kanagawa (JP)

(72) Inventors: Kazuhiro Fujita, Tokyo (JP); Takashi Sasaki, Kanagawa (JP); Momotaro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 302 days.

(21) Appl. No.: 18/520,570

(22) Filed: Nov. 28, 2023

(65) Prior Publication Data

US 2024/0176220 A1    May 30, 2024

(30) Foreign Application Priority Data

Nov. 29, 2022 (JP) .................. 2022-190660
Feb. 17, 2023 (JP) .................. 2023-023726
Aug. 3, 2023 (JP) .................. 2023-127303

(51) Int. Cl.
G03B 21/20 (2006.01)
(52) U.S. Cl.
CPC ....... G03B 21/204 (2013.01); G03B 21/2066 (2013.01); G03B 21/208 (2013.01)
(58) Field of Classification Search
None
See application file for complete search history.

(56) References Cited

U.S. PATENT DOCUMENTS

| 2017/0299953 | A1 | 10/2017 | Maeda et al. |
| 2017/0307969 | A1* | 10/2017 | Kawasumi ......... G03B 21/2073 |
| 2018/0024425 | A1 | 1/2018 | Fujita et al. |
| 2019/0129288 | A1 | 5/2019 | Maeda et al. |
| 2020/0201158 | A1 | 6/2020 | Maeda et al. |
| 2021/0136336 | A1 | 5/2021 | Takano et al. |
| 2021/0200075 | A1 | 7/2021 | Nakamura et al. |
| 2022/0066177 | A1 | 3/2022 | Takano et al. |
| 2022/0171267 | A1 | 6/2022 | Takano et al. |
| 2022/0179298 | A1 | 6/2022 | Fujita et al. |
| 2022/0299852 | A1 | 9/2022 | Nakamura et al. |

(Continued)

FOREIGN PATENT DOCUMENTS

| JP | 2014-160233 A | 9/2014 |
| JP | 2017-062294 A | 3/2017 |

(Continued)

*Primary Examiner* — Bao-Luan Q Le
*Assistant Examiner* — Danell L Owens
(74) *Attorney, Agent, or Firm* — XSENSUS LLP

(57) ABSTRACT

An illumination device includes: a light source unit including: a light source to emit a light beam; and a wavelength converter rotatable to convert a wavelength of the light beam; another light source unit including: another light source to emit another light beam; and another wavelength converter rotatable to convert another wavelength of said another light beam; a light homogenizer to homogenize the light beam and said another light beam; and a light combiner to: bend the light beam to guide the light beam into the light homogenizer in one direction, and guide said another light beam into the light homogenizer in a another direction parallel to said one direction.

12 Claims, 15 Drawing Sheets

(56) References Cited

U.S. PATENT DOCUMENTS

| | | | |
|---|---|---|---|
| 2022/0342291 A1 | 10/2022 | Fujita et al. | |
| 2022/0345671 A1* | 10/2022 | Sasaki | G03B 21/204 |
| 2022/0382137 A1 | 12/2022 | Takano et al. | |
| 2023/0042973 A1 | 2/2023 | Fujita et al. | |
| 2023/0043477 A1 | 2/2023 | Nakamura et al. | |
| 2023/0110183 A1 | 4/2023 | Yohei et al. | |
| 2023/0251558 A1 | 8/2023 | Nakamura et al. | |
| 2023/0259012 A1 | 8/2023 | Sasaki et al. | |
| 2023/0288791 A1 | 9/2023 | Takano et al. | |

FOREIGN PATENT DOCUMENTS

| | | |
|---|---|---|
| JP | 2017-194494 A | 10/2017 |
| JP | 2021-086135 A | 6/2021 |
| JP | 2023-119544 A | 8/2023 |

* cited by examiner

COMPARATIVE EXAMPLE

COMPARATIVE EXAMPLE

COMPARATIVE EXAMPLE

COMPARATIVE EXAMPLE

ILLUMINATION DEVICE AND IMAGE PROJECTION APPARATUS

CROSS-REFERENCE TO RELATED APPLICATIONS

This patent application is based on and claims priority pursuant to 35 U.S.C. § 119(a) to Japanese Patent Application No. 2022-190660, filed on Nov. 29, 2022, in the Japan Patent Office, Japanese Patent Application No. 2023-023726, filed on Feb. 17, 2023, in the Japan Patent Office, and Japanese Patent Application No. 2023-127303, filed on Aug. 3, 2023, in the Japan Patent Office, the entire disclosure of each are hereby incorporated by reference herein.

BACKGROUND

Technical Field

The present disclosure relates to an illumination device and an image projection apparatus.

Related Art

Some technologies to magnify and project various images, for example, a projector or an image projection apparatus are known. Such an image projection apparatus condenses a light beam emitted from a light source on a spatial light modulator (i.e., an image display element) such as a digital micromirror device (DMD) or a liquid crystal display (LCD) element and projects a reflected light beam or a transmitted light beam (i.e., an emitted light beam modulated based on an image signal) from the spatial light modulator to display a color image on a screen.

SUMMARY

According to an embodiment of the present disclosure, an illumination device includes: a light source unit including: a light source to emit a light beam; and a wavelength converter rotatable to convert a wavelength of the light beam: another light source unit including: another light source to emit another light beam; and another wavelength converter rotatable to convert another wavelength of said another light beam: a light homogenizer to homogenize the light beam and said another light beam; and a light combiner to: bend the light beam to guide the light beam into the light homogenizer in one direction, and guide said another light beam into the light homogenizer in a another direction parallel to said one direction. A relation below is satisfied: D>d, where: D is a distance between a plane A and a plane B in a perpendicular direction perpendicular to the plane A, and d is a distance between a rotation center of the wavelength converter and another rotation center of said another wavelength converter, or between a center of the light source and another center of said another light source, in the perpendicular direction. The plane A is a plane including: a position of a brightest irradiation spot on the wavelength converter: and a position of a brightest irradiation spot on the light homogenizer, wherein the plane A is parallel to an optical path of the light beam incident on the light homogenizer, and the plane B is a plane including: a position of a brightest irradiation spot on said another wavelength converter: and a position of a brightest irradiation spot on the light homogenizer. The plane B is parallel to the plane A.

According to an embodiment of the present disclosure, an image projection apparatus includes, the illumination device described above: and an image generator to generate an image from a light beam emitted from the illumination device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
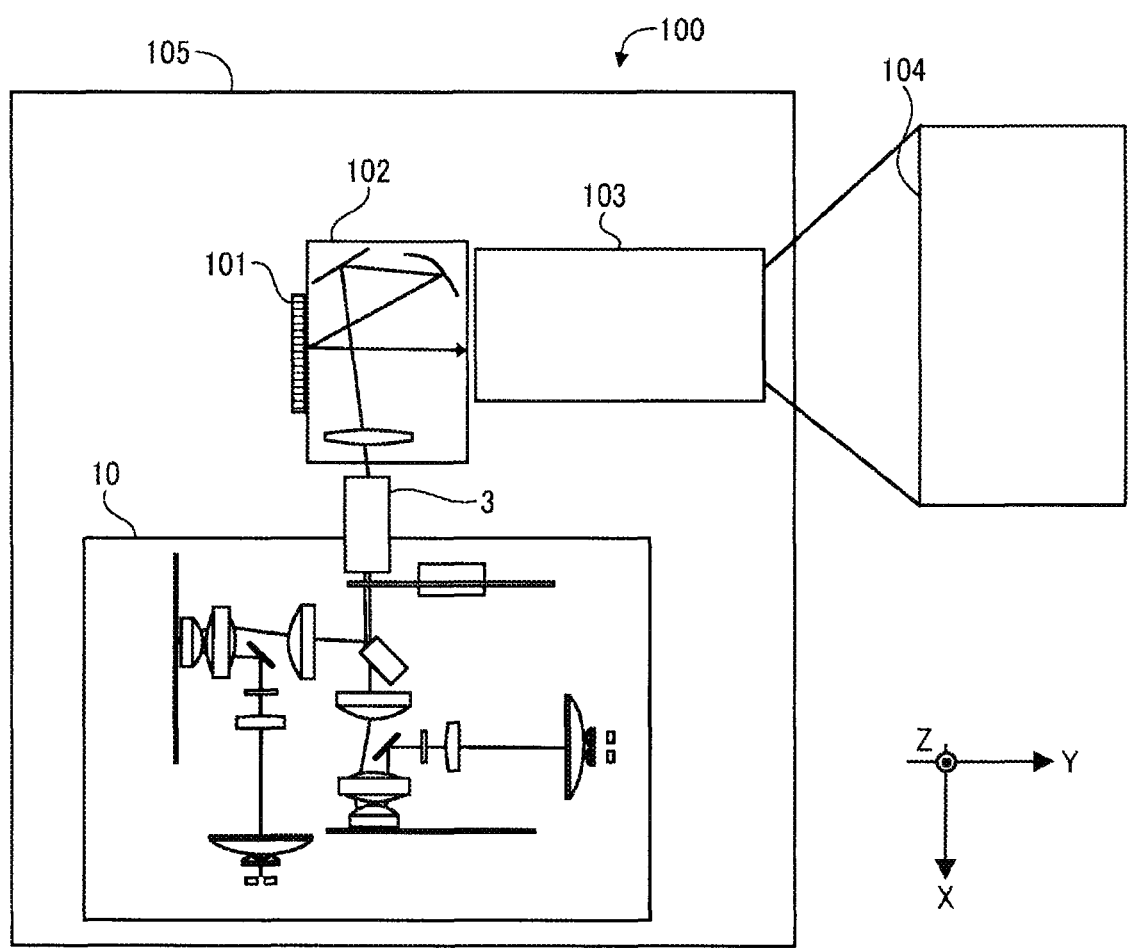
FIG. 1 is a diagram illustrating a configuration of an image projection apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below: As used herein, the singular forms "a," "an," and "the" are intended to include the plural forms as well, unless the context clearly indicates otherwise.

According to an embodiment of the present disclosure, the illumination device can be reduced in size by optimizing the arrangement of the light source while keeping the overall height of the illumination device lower.

Although a high-brightness and ultra-high pressure mercury lamp has been used as a light source in an image projection apparatus, a solid-state light source such as a light emitting diode (LED) lamp or a laser light source has been increasingly used due to increased environmental awareness and the longer life. An illumination light source including at least three primary colors is required for a light source of a color image. However, it is not preferable to generate all three primary colors with a laser light source having a specific wavelength from the aspect of luminous efficiency and high brightness of a solid light source. Thus, a configuration using a combination of a blue laser light source and a florescent material (e.g., a phosphor) becomes a mainstream of a light source of a color image. Specifically, the blue laser light source emits a blue light beam having the highest luminous efficiency as an excitation light beam to a fluorescent material that is a wavelength converter to generate a red light beam and a green light beam from the fluorescent material. In other words, the green light beam and the red light beam are wavelength-converted light beams.

In the configuration described above, two light sources may be used, and it is needed to combine the two light beams from the two light sources as one emitted light beam to be projected on a screen.

Embodiments of the present disclosure will be described below with reference to the drawings. In the descriptions and drawings of the embodiments of the present disclosure, the same or like reference signs denote like elements having substantially the same or corresponding functions and configurations, and descriptions thereof may be omitted. The drawings may be partially omitted or simplified in order to facilitate the understanding of some components. In the following description, the X-direction, the Y-direction, and the Z-direction are perpendicular to each other. Although the X-direction and the Y-direction are illustrated as the horizontal directions and the Z-direction is illustrated as the vertical direction, but the directions are not limited thereto.

FIG. 1 is a diagram of a configuration of an image projection apparatus 100 including an illumination device 10 as a first embodiment of the present disclosure. The image projection apparatus 100 includes the illumination device 10 serving as a light source device, a digital micromirror device (DMD) 101 serving as a spatial light modulator for modulating an illumination light beam generated by the illumination device 10, an illumination optical system 102 for substantially homogenizing a light beam emitted from the illumination device 10 and guiding the light beam to the DMD 101, and a projection optical system 103 for enlarging and projecting the light beam spatially modulated by the DMD 101 to a projection surface 104. The image projection apparatus 100 generates a projection image on the projection surface 104 by the configuration described above.

The DMD 101 is a spatial light modulator that adds image data to the light beam emitted from the illumination device 10 by reflecting the light beam incident on the surface of the DMD with micromirrors arranged on the surface of the DMD. In an embodiment of the present disclosure, the DMD 101 is used as a spatial light modulator, however, a transmissive liquid crystal element or a reflective liquid crystal element may be used.

The projection optical system 103 is an optical system arranged at a downstream part of an optical path away from the DMD 101 and is an optical system for projecting the light beam toward the projection surface 104 (e.g., a screen). The illumination optical system 102 is an optical system for guiding an illumination light beam from the illumination device 10 toward the DMD 101. The projection optical system and the illumination optical system include optical elements including lenses and mirrors, and are incorporated in the housing 105 of the image projection apparatus 100.

Figure 2:
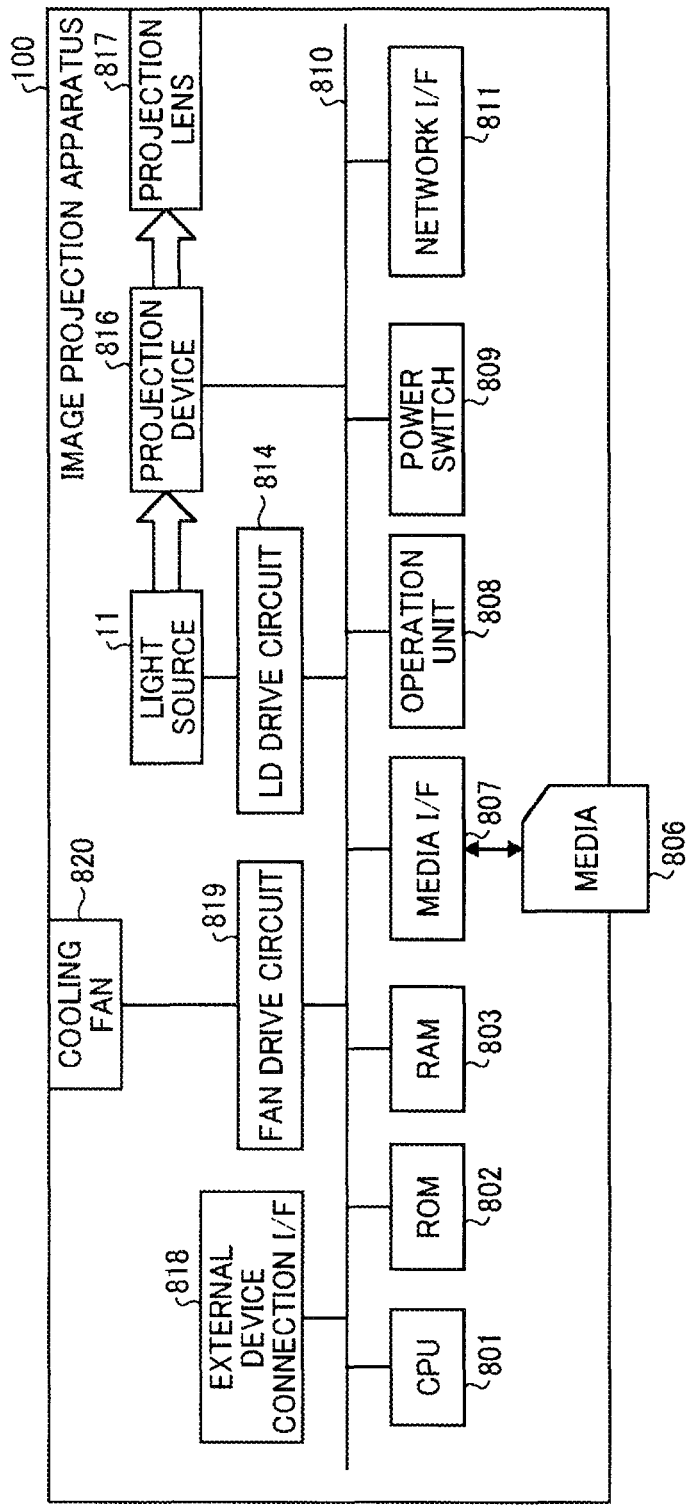
FIG. 2 is a block diagram illustrating a configuration of circuitry of an image projection apparatus according to an embodiment of the present disclosure.

FIG. 2 is a diagram of a hardware configuration of circuitry of the image projection apparatus 100. The image projection apparatus 100 includes a central processing unit (CPU) 801, a read only memory (ROM) 802, a random access memory (RAM) 803, a media interface (I/F) 807, an operation unit 808, a power switch 809, a bus line 810, a network interface (I/F) 811, a laser diode (LD) drive circuit 814, a light source 11, a projection device 816, a projection lens 817, an external device connection interface (I/F) 818, a fan drive circuit 819, and a cooling fan 820. The CPU 801 controls the whole operation of the image projection apparatus 100. The ROM 802 stores a program used to drive the CPU 801. The RAM 803 is used as a working area of the CPU 801. The media I/F 807 controls the media 806 such as a flash memory to read or write (store) data. The operation unit 808 includes various keys, buttons, or LEDs. and is used to perform various operations other than ON and OFF (ON/OFF) of the power supply of the image projection apparatus 100 by the user. For example, the operation unit 808 receives instruction operations such as an adjustment of the size of the projection image, an adjustment of a color tone, a focus adjustment, and a keystone adjustment, and outputs the received operation to the CPU 801. The power switch 809 is a switch to switch ON and OFF the power of the image projection device 100. The bus line 810 is an address bus or a data bus for electrically connecting each component such as the CPU 801 illustrated in FIG. 8. The network I/F 811 is an interface to perform data communication using a communication network such as the Internet. The light source drive circuit 814 controls the light source 11 to turn on and off under the control of the CPU 801. When the light source 11 is turned on under the control of the LD drive circuit 814, the light source 11 emits a projection light beam to the projection device 816. The light source 11 includes, for example, a light emitting element such as a laser diode (LD) device or a light emitting diode (LED) device, or a solid light source element, and constitutes a light source unit. Based on an image data given via, for example, the external device connection I/F 818, the projection device 816 projects a modulated light beam obtained by modulating the projection light beam from the light source 11 using a spatial light modulation method to the projection surface of the screen as an image through the projection lens 817. As the projection device 816, for example, the liquid crystal panel or the DMD is used. The LD drive circuit 814, the light source 11, the projection device 816, and the projection lens 817 work as a projection device (a projection method) as a whole to project a projection image on a projection surface based on image data. A personal computer (PC) is directly connected to the external device connection I/F 818 to acquire control signals and image data with the PC. The fan drive circuit 819 is connected to the CPU 801 and the cooling fan 820, and drives or stops the cooling fan 820 based on a control signal from the CPU 801. The cooling fan 820 exhausts the air inside the image projection apparatus 100 to cool the inside of the image projection apparatus 100 by rotating the fan. When the electric power is supplied, the CPU 801 is activated according to a control program stored in the ROM 802 in advance, and provides a control signal to the LD drive circuit 814 to turn on the light source 11 and also provides a control signal to the fan drive circuit 819 to rotate the cooling fan 820 at a predetermined speed. In addition, in the image projection apparatus 100, when the power supply from the power supply circuit 21 is started, the projection device 816 is ready to display an image, and further, power is supplied from the power supply circuit 21 to other various components. Further, in the image projection apparatus 100, when the power switch 809 is turned off, a power OFF signal is sent from the power switch 809 to the CPU 801, and when the CPU 801 detects the power OFF signal, the CPU 801 gives a control signal to the LD drive circuit 814 to turn off the light source 11. After passing a predetermined time, the CPU 801 provides a control signal to the fan drive circuit 819 to stop the cooling fan 820, finishes the CPU's control processing, and provides an instruction to the power supply circuit 21 to stop the power supply.

Figure 3:
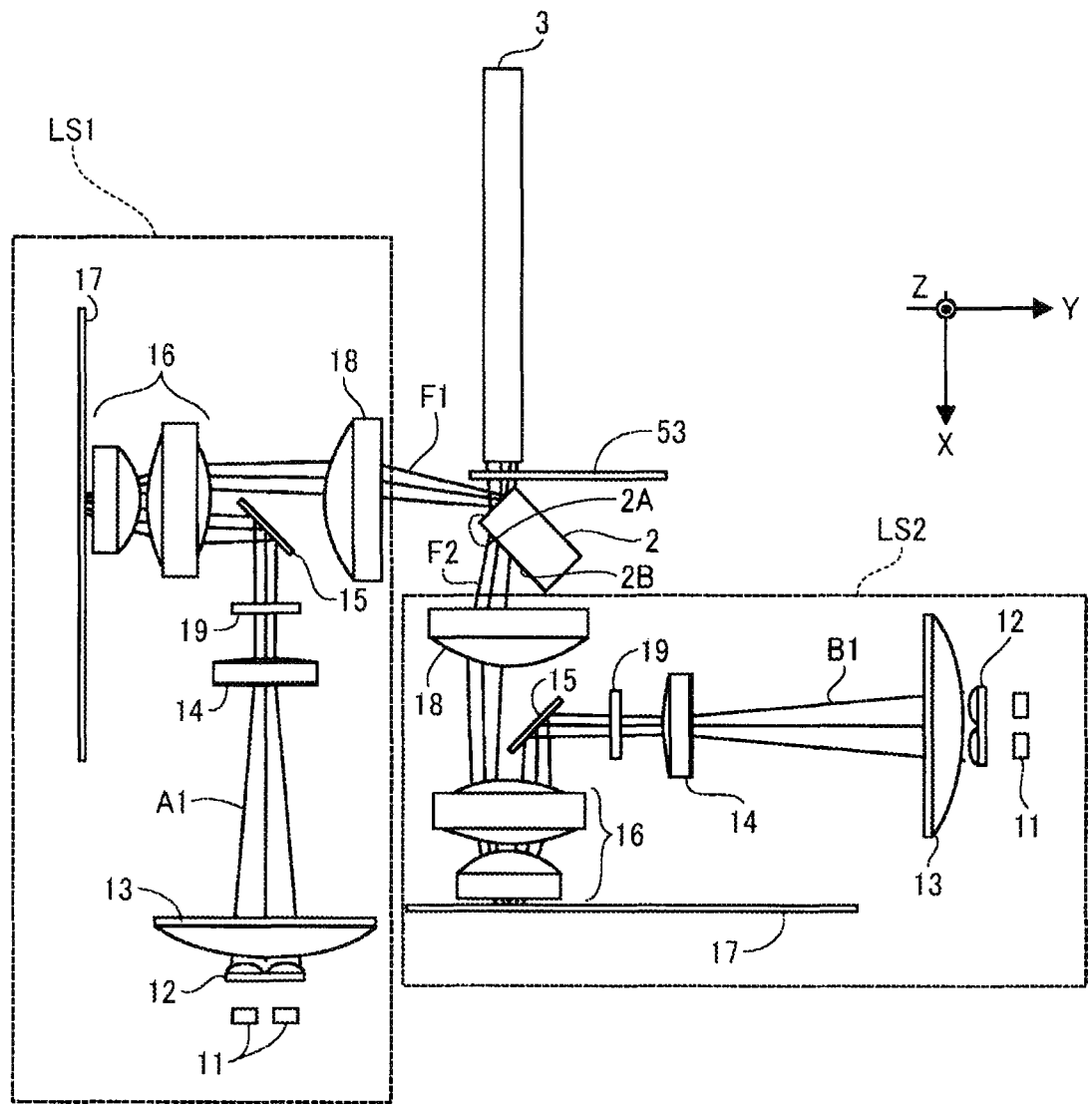
FIG. 3 is a diagram illustrating a configuration of an illumination device in FIG. 1 according to an embodiment of the present disclosure.

As illustrated in FIG. 3, the illumination device 10 includes a first light source unit LS1 and a second light source unit LS2, which are two main light source units, and forms a homogenized illumination light beam by combining a light beam (i.e., a first light beam) emitted from the first light source unit LS1 and another light beam (i.e., a second light beam) emitted from the second light source unit LS2 by a prism 2 and entering a combined light beam into a rod integrator 3 (i.e., a light homogenizer). The first light source unit LS1 and the second light source LS2 are different from each other.

The prism 2 is an optical element for guiding a light beam F1 from the first light source unit LS1 in the same direction as another light beam F2 from the second light source unit LS2. In an embodiment of the present disclosure, the prism 2 is a polyhedron having four or more facets, and one of the facets of the prism 2 on which the light beam F1 from the first light source unit LS1 is incident is a reflection surface 2A. The prism 2 is an element for combining and guiding the light beams from two or more light source units in substantially the same direction, and is not limited to the element or the configuration described above, and may have a multi-faceted configuration for combining the light beams from three or more light source units.

The reflection surface 2A may be, for example, a surface formed on a slope of a triangular prism, or a flat mirror formed on one side of the triangular prism. In an embodiments of the present disclosure, at least two light source units are used. As illustrated in FIG. 3, an illumination device includes two light source units that includes, for example, a first light source unit LS1 as a light source unit and a second light source unit LS2 as another light source unit.

Figure 19:
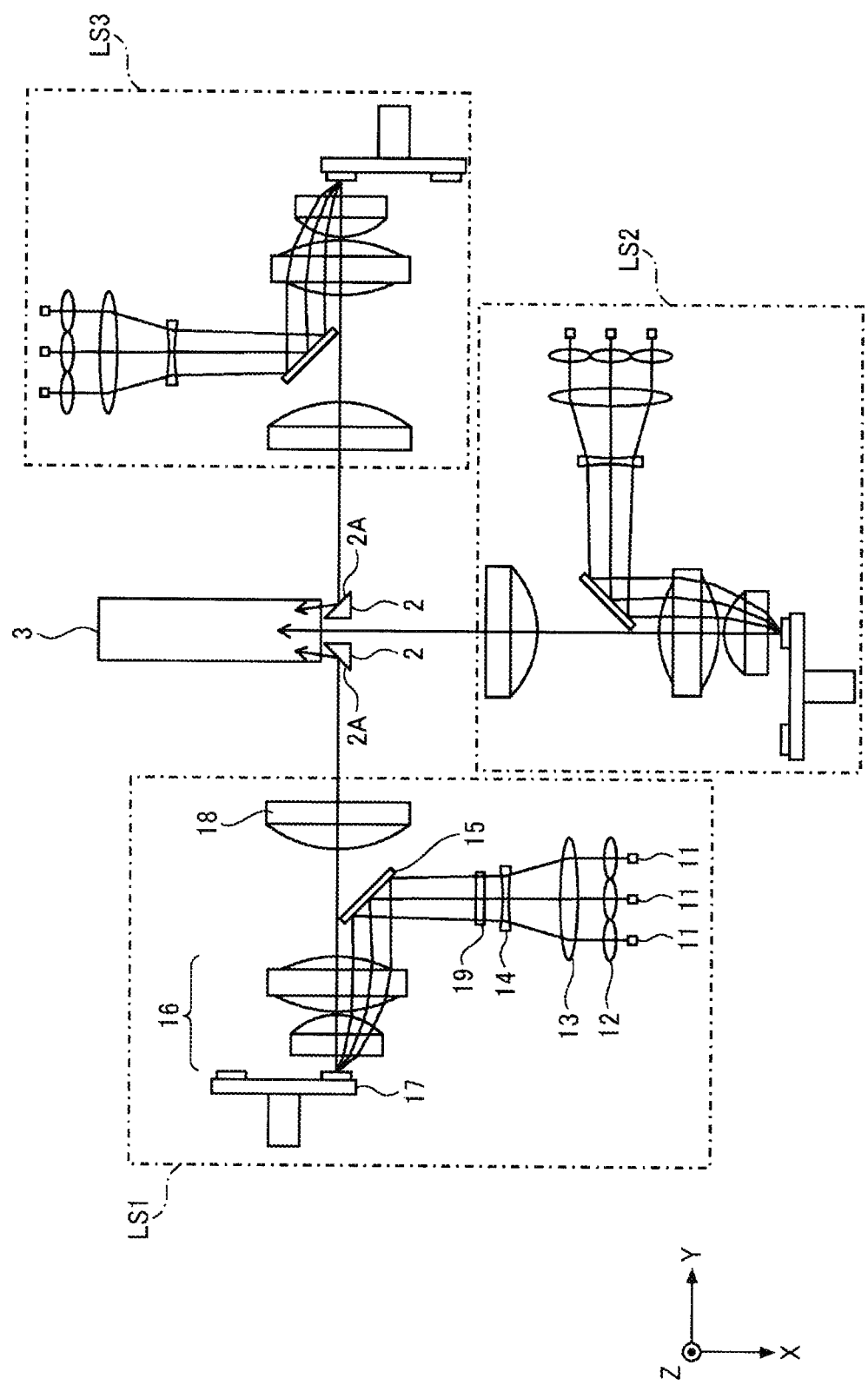
FIG. 19 is a diagram illustrating a configuration of an illumination device including three light source unit.

When three light source units are used, a first light source unit LS1, a second light source unit LS2, and a third light source unit LS3 are disposed as illustrated in FIG. 19 as at least two light source units. In an embodiment of the present disclosure, any two light source units of the three light source units can be used.

For example, the light source unit LS1 of the at least two light source units is selected as a light source unit, and the light source LS2 of the at least two light source units is selected as another light source unit for an illumination device according to an embodiment of the present disclosure. Thus, a height of a portion in which the light source unit LS1 and the light source unit LS2 are disposed can be reduced (i.e., an empty space can be created).

For example, the light source unit LS3 of the at least two light source units is selected as a light source unit, and the light source unit LS2 of the at least two light source units is selected as another light source unit for an illumination device according to an embodiment of the present disclosure. Thus, a height of a portion, in which the light source unit LS2 and the light source unit LS3 are disposed, can be reduced (i.e., an empty space can be created).

Further, the light source unit LS3 of the at least two light source units is selected as a light source unit, and the light source unit LS1 of the at least two light source units is selected as another light source unit for an illumination device according to an embodiment of the present disclosure. Then, a height of a portion, in which the light source unit LS3 and the light source unit LS1 are disposed, can be reduced (i.e., an empty space can be created).

Accordingly, an LD drive circuit board, a cooling fan, or a wind path can be arranged in the empty space, and a whole layout of the device or the apparatus can be optimized. As a result, the size of the device or the apparatus can be reduced.

As described above, any two light source units can be used in an embodiment of the present disclosure, but, in particular, an illumination device including the light source unit LS1 and the light source unit LS2 is described below:

In addition, an additional light source unit such as a third or fourth light source unit except any two light source units according to an embodiment of the present disclosure may not be limited to a light source unit using a phosphor wheel described below and may be a light source unit to emit a monochromatic light beam or a light beam having multiple wavelengths. Further, an additional light source unit such as a third or fourth light source unit except any two light source units may be disposed outside the housing.

The prism 2 may also have, for example, a diffusing surface. By using a diffusing surface as described above, unevenness in color and luminance of a light beam can be eliminated by passing through the diffusing surface. As a method for eliminating such unevenness in color and luminance, a separate diffusion plate may be used, and the method is not limited to the configuration in which the diffusing surface is used.

The prism 2 reflects the light beam F1 from the first light source unit LS1 in the configuration described above, and guides the first light beam F1 to the rod integrator 3 (i.e., a light homogenizer) in substantially the same direction as the light beam F2 from the second light source unit LS2. In the configuration, the light beam F2 propagates near the prism 2 (e.g., the upper side of the drawing in the Z-direction).

In an embodiment of the present disclosure, the rod integrator 3 is a rod-shaped glass and is an optical element that homogenizes an incident light beam by reflecting the incident light beam multiple times inside the rod integrator 3. Specifically, the rod integrator 3 homogenizes the light beam F1 from the first light source unit LS1 and the light beam F2 from the second light source unit LS2 incident on the rod integrator 3 in the illuminance or the distribution of the light intensity and emits a homogenized illumination light beam L. In an embodiment of the present disclosure, the rod integrator having high efficiency and high output is used. Further, as a light homogenizer, a prism light tunnel having four mirrors bonded together may be used, or a fly-eye lens may be used. The rod integrator 3 has a limitation on an incident angle of an incident light beam. As described later, light emission positions from the prism 2 for the light beam F1 from the first light source unit LS1 and the light beam F2 from the second light source unit LS2 are adjusted so that the incident angles for the light beam F1 and the light beam F2 are within the limitation of the incident angle of the rod integrator 3 at light incident positions on the rod integrator 3.

Since the first light source unit LS1 and the second light source unit LS2 have the same or equivalent configuration, the elements of the first light source unit LS1 will be mainly described, and the elements of the second light source unit LS2 will also be denoted by the same reference numerals and description thereof will be omitted as appropriate. The first light source unit LS1 includes a light source 11 serving as a light source for emitting an excitation light beam, a collimator lens 12 arranged opposite to the light source 11, a light source optical system 13, a light condensing element 14, a dichroic mirror 15, a wavelength converter 17, a first condensing optical system 16, and a second condensing optical system 18. The illumination device 10 includes at least two light source units described above.

The light source 11 is a light source according to an embodiment of the present disclosure, and includes a multichip laser diode unit in which multiple light emitting portions 11A are arranged on a two-dimensional plane. In an embodiment of the present disclosure, the center of the plane in which the multiple light emitting portions 11A are arranged is referred to as "the center position of the light source". Collimator lenses 12 are arranged in an array at a position facing the light emitting portions 11A, and convert excitation light beams emitted from the multiple light emitting portions 11A into parallel light beams. The light source optical system 13 is a lens for condensing the excitation light beams converted into the parallel light beams by the collimator lenses 12. The center of the light source 11 typically coincides with the optical axis of the excitation light beam emitted from the light source 11. Thus, the light source optical system 13 is disposed so that the center of the light source and the position of the optical axis of the light source optical system 13 are aligned with each other.

The light condensing element 14 is a lens arranged in the rear part of the light source optical system 13. In a light beam transmitted through the light condensing element 14 (i.e., a transmitted light beam), only a portion of the transmitted light beam having a specific wavelength is reflected by the dichroic mirror 15 (i.e., a reflected light beam) and the reflected light beam generates a first irradiation spot 51 at a predetermined position on the wavelength converter 17 by the first condensing optical system 16. In other words, the wavelength converter 17 is disposed near the first irradiation spot 51. The first irradiation spot 51 is an irradiation region having a certain area, and the brightest position in the irradiation region indicates the spot center of the first irradiation spot 51, and the brightest position substantially coincides with the focal position of the first condensing optical system 16.

Figure 4:
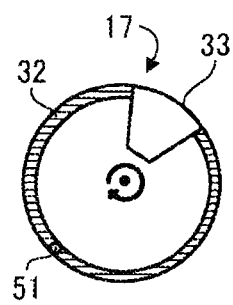
FIG. 4 is a diagram illustrating a configuration of a wavelength converter illustrated in FIG. 3 according to an embodiment of the present disclosure.

The wavelength of the light beam condensed on the first irradiation spot 51 is converted by the wavelength converter 17 into another wavelength different from the wavelength of the excitation light beam of the light source 11. The wavelength converter 17 is a disk-shaped phosphor wheel (i.e., a phosphor wheel) as illustrated in FIG. 4. The wavelength converter 17 is attached to a drive motor and rotated at a higher speed to temporally move a position on the wavelength converter 17 on which the first irradiation spot 51 is formed. In an embodiment of the present disclosure, the wavelength converter 17 has a phosphor region 32 on which the phosphor (i.e., fluorescent material) is coated and an excitation light reflection region 33 that reflects the excitation light beam. Since the wavelength converter 17 is rotated, the position of the first irradiation spot 51 is located at either the phosphor region 32 or the excitation light reflection region 33. In FIG. 4, in the case where the wavelength converter 17 is divided into two regions is described, the phosphor region 32 may be divided into two or more regions, and the excitation light reflection region 33 may be provided in multiple regions. In the wavelength converter 17 in the configuration described above, in the case where the blue light beam having a center wavelength of 455 nm in the emission intensity as the excitation light beam emitted from the light source 11 is used, the wavelength converter 17 emits a blue light beam when the first irradiation spot 51 strikes the excitation light reflection region 33 and emits a phosphor light beam when the first irradiation spot 51 strikes the phosphor region 32.

In at least some embodiments, in the illumination device, the light combiner has a reflection portion to reflect the light beam from the light source unit to the light homogenizer.

In the case of the light beam F1 from the first light source unit LS1, the light beam F1 reflected by the wavelength converter 17 again passes through the first condensing optical system 16 and is condensed by the second condensing optical system 18, is bent at the reflection surface 2A, passes through a color wheel 53, and enters the rod integrator 3. In the case of the light beam F2 from the second light source unit LS2, the light beam F2 transmits the prism 2, passes through a color wheel 53, and enter the rod integrator 3. The color wheel 53 is a disk including filters of a red region R, a blue region B, a green region G, and a yellow region Y, which are assembled as one body. The color wheel 53 transmits the light beam F1 from the first light source unit LS1 and the light beam F2 from the second light source unit LS2, while rotating, and converts the incident light beams into color beams of red, blue, green, and yellow with time division. The blue region B corresponds to the excitation light reflection region 33 of the phosphor wheel of the wavelength converter 17 illustrated in FIG. 4, and the yellow region Y, the red region R. and the green region G are synchronized so as to correspond to the phosphor region 32 of the wavelength converter 17 illustrated in FIG. 4. The coherence of the light source 11 is reduced by arranging a transmissive diffuser in the blue region B. and the speckle on the projection surface 104 is reduced. The yellow region Y transmits the wavelength band of the yellow fluorescence emitted from the phosphor region 32 as it is. Further, the red region R and the green region G respectively reflect the light beam in an unusable wavelength range from the wavelength of the yellow fluorescent light L2 by using a dichroic mirror to obtain higher-purity color light beam. As described above, a light beam of each color is temporally generated by the wavelength converter 17 and the color wheel 53. The temporally generated light beam of each color is guided to the DMD 101 through the illumination optical system 102 to form an image corresponding to each color, and is enlarged and projected onto the projection surface 104 by the projection optical system 103.

Figure 5:
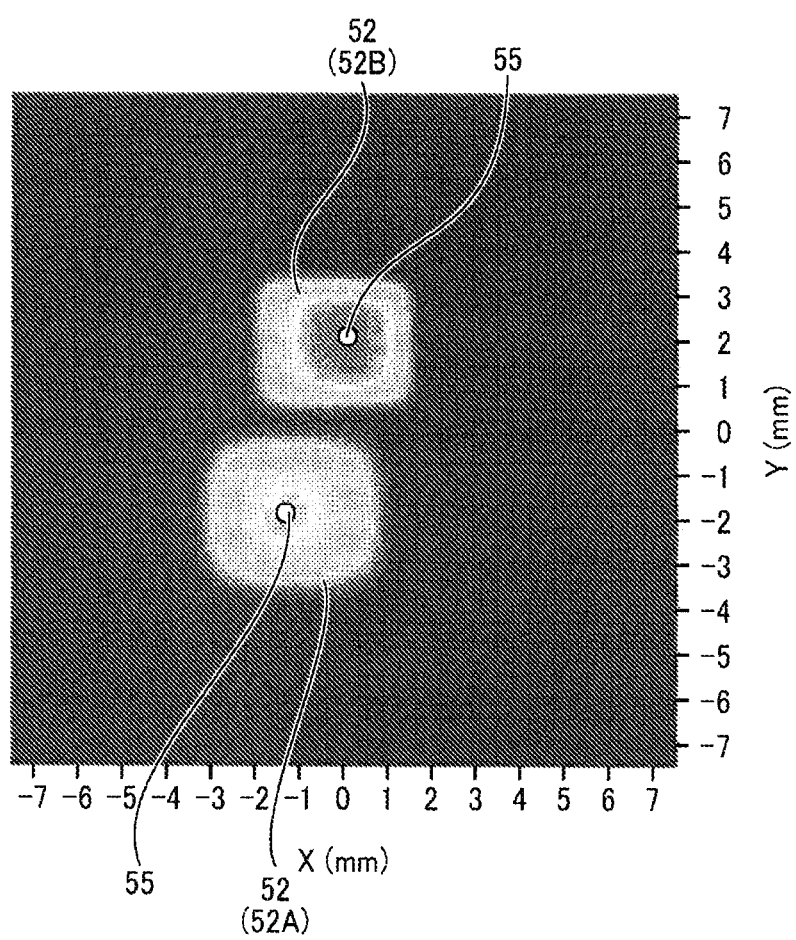
FIG. 5 is a diagram illustrating a measurement result of a light intensity distribution at an entrance of a light homogenizer illustrated in FIG. 3 according to an embodiment of the present disclosure.

In the illumination device 10 described above, the second irradiation spot 52 condensed by the second condensing optical system 18 is formed at the entrance of the rod integrator 3. In an embodiment of the present disclosure, the second irradiation spots 52 formed at the entrance of the rod integrator 3 by the light beam F1 from the first light source unit LS1 and the light beam F2 from the second light source unit LS2 are illustrated in FIG. 5. The second irradiation spot 52 of the light beam F1 is represented as the second irradiation spot 52A, and the second irradiation spot 52 of the light beam F2 is represented as the second irradiation spot 52B. The second irradiation spot 52 is a region in which the light beam from the first light source unit LS1 or the second light source unit LS2 is condensed, and a position in which the light intensity distribution is the brightest (i.e., the light intensity is the highest) is determined when the light intensity distribution is measured. In the beam optical system, such a position may be referred to as the spot center 55 of the second irradiation spot 52. The spot center 55 described above is, for example, the center position or the center of the beam profile image in displaying the measurement result of the light intensity distribution of the beam cross section in the two-dimension as illustrated in FIG. 5. In other words, the center is the brightest position in the beam profile.

Examples of the rod integrator 3 include an elongated rectangular glass rod. When the light beam F1 from the first light source unit LS1 and the light beam F2 from the second light source unit LS2 are incident on the rod integrator 3, the incident angle is limited. It is preferable that the second irradiation spots 52 of the light beam F1 and the light beam F2 are arranged so as not to overlap each other at the entrance of the rod integrator 3 in order to homogenize the illuminance at the entrance of the rod integrator 3 over a wider range. In some known technologies, when combining the light beam F1 from the first light source unit LS1 and the light beam F2 from the second light source LS2, the first light source unit LS1 and the second light source unit LS2 are typically arranged horizontally with respect to the X-direction of the longitudinal direction of the rod integrator 3.

Figure 6:
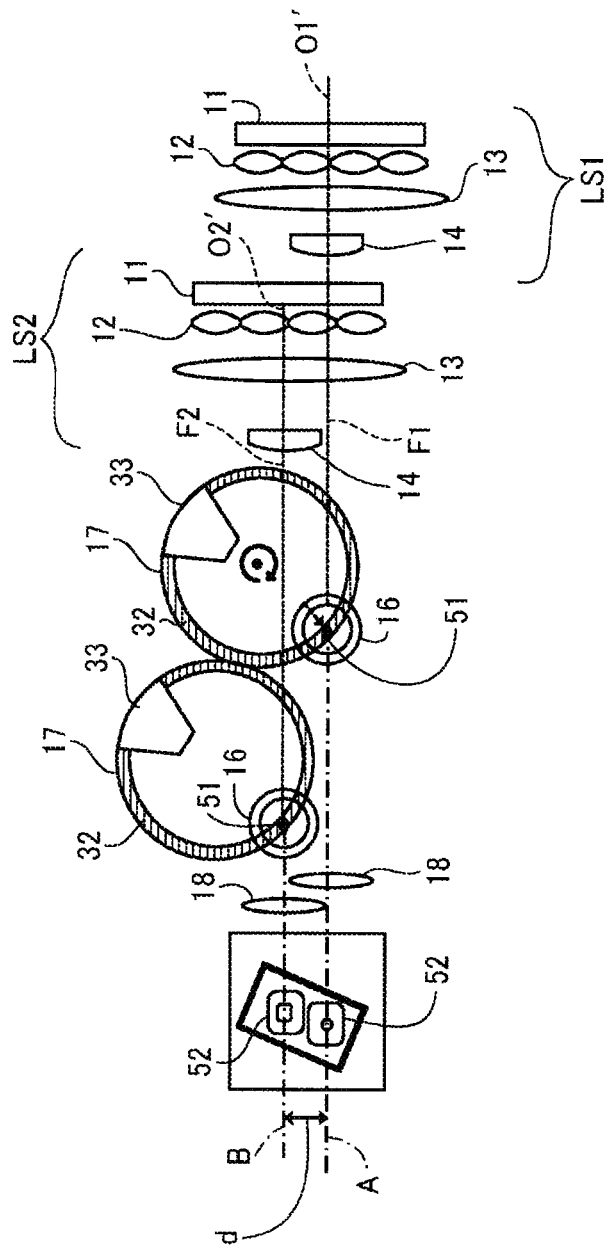
FIG. 6 is a diagram of a comparative example of optical paths and a positional relation of light beams emitted from light source units.

By contrast, in a known configuration, the first light source unit LS1 and the second light source unit LS2 are arranged in an uneven manner (i.e., uneven arrangement) with a gap in the Z-direction (i.e., the height direction) in order to form the second irradiation spots 52 so as not to overlap each other. Such an uneven arrangement will be described in detail below. In a comparative example in FIG. 6, optical paths are virtually illustrated in the case where an uneven arrangement is adopted in a configuration equivalent to the configuration of an embodiment of the present disclosure. FIG. 6 is a schematic diagram illustrating a relation between a position of an optical axis of the first light source unit LS1, a position of an optical axis of the second light source unit LS2, and positions of the second irradiation spots 52 illustrated in FIG. 4, and an optical path of the first light source unit LS1 and an optical path of the second light source unit LS2 are parallel. Further, since elements of the comparative example are equivalent to the elements of the embodiments of the present disclosure described in FIGS. 3 and 4, the same reference numerals are assigned to each element, and the description thereof is appropriately omitted.

The uneven arrangement illustrated in FIG. 6, there is a gap d between the first light source unit LS1 and the second light source unit LS2. A plane A and a plane B (i.e., virtual planes) are introduced to describe the gap d (i.e., the space). In the plane A, the light beam F1 from the first light source unit LS1 is incident on and reflected from the reflection surface 2A of the prism 2. In other words, the plane A is parallel to a plane including optical axes of the light beam F1 incident on and reflected from the reflection surface 2A and the brightest position of the first irradiation spot 51 and the brightest position of the second irradiation spot 52. The plane A is a plane that virtually drawn at a position represented by a dot-and-dash line in FIG. 6 when the optical path is cut off in the Y-Z plane. As described above, the first light source unit LS1 of the comparative example is arranged so that the optical axis O1' is arranged at a position parallel to the plane A and the X-direction.

Figure 7:
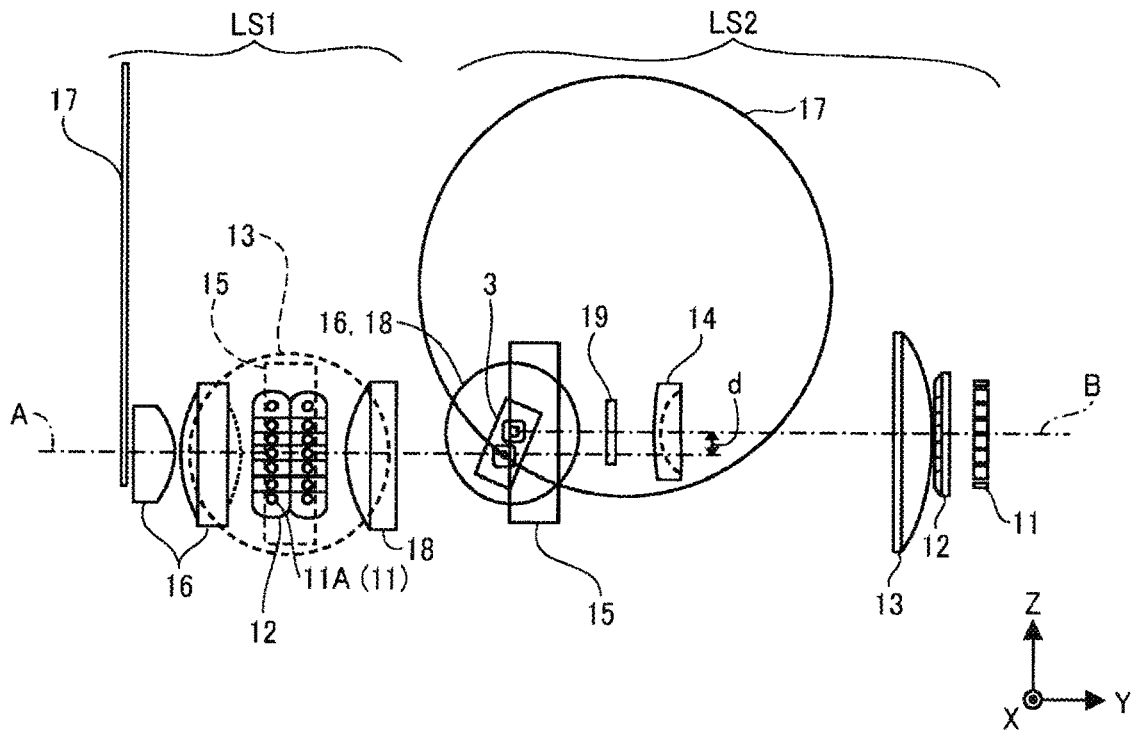
FIG. 7 is a diagram schematically illustrating a positional relation of the light source units of the illumination device of the comparative example illustrated in FIG. 6.

In the second light source unit LS2, the plane B is parallel to the plane A and includes the first irradiation spot 51 and the second irradiation spot 52 of the light beam F2 from the second light source unit LS2. The second light source unit LS2 is arranged so that the optical axis O2' is disposed horizontally with respect to the plane B and the X-direction. Thus, the center of the light source 11 of the first light source unit LS1 and the center of the second light source unit LS2 are separated from each other in the vertical direction (i.e., the Z-direction) by the distance d between the plane A and the plane B. and the illumination device 10 is increased in size by the gap in the height direction. FIG. 7 is a diagram of the optical path in an uneven arrangement corresponding to FIG. 6 as viewed from the X-direction in FIG. 3 (i.e., as viewed on the Y-Z plane). The Z-direction is the height direction (i.e., the vertical direction as described above). As illustrated in FIG. 7, the gap d is a distance between the plane A and the plane B in the Z-direction (i.e., the height direction) in the comparative example.

Figure 8:
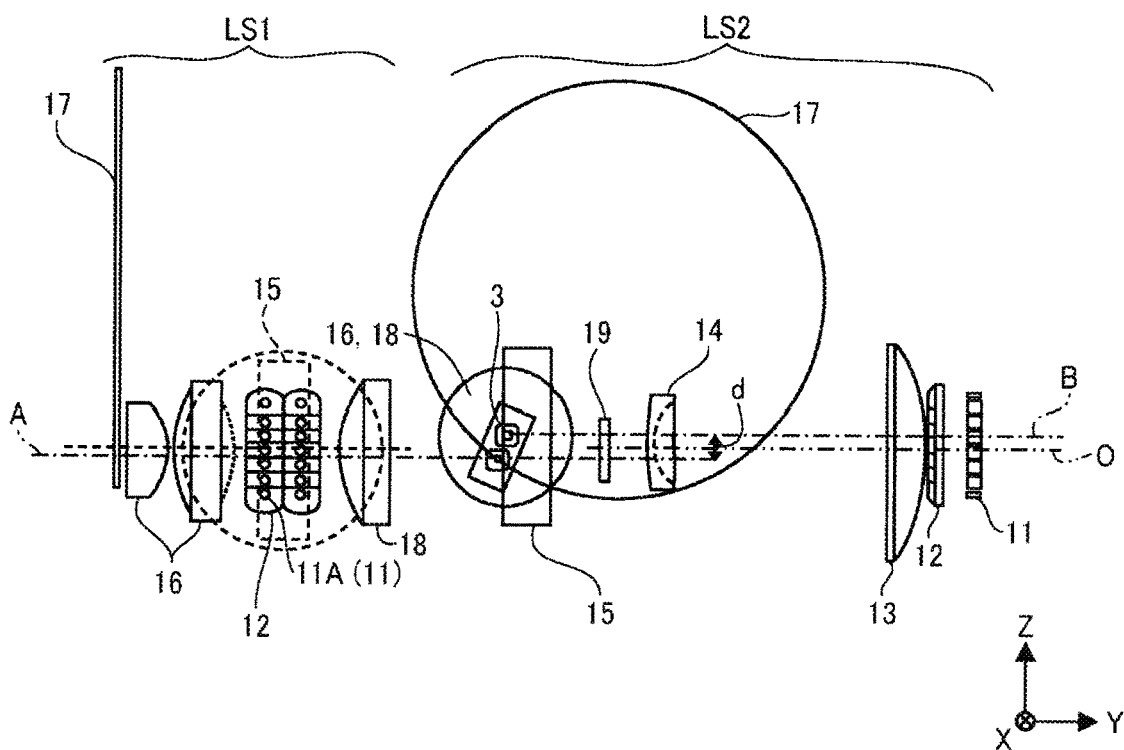
FIG. 8 is a diagram illustrating optical paths of the illumination device illustrated in FIG. 3 as viewed from another direction according to an embodiment of the present disclosure.
Figure 9:
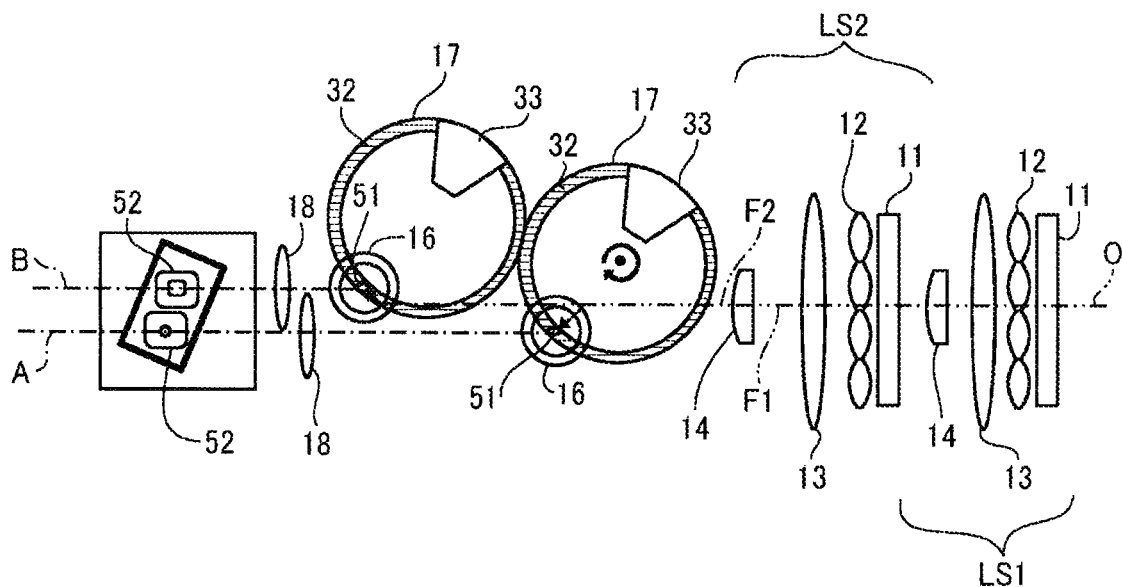
FIG. 9 is a diagram schematically illustrating the configuration illustrated in FIG. 8.

Accordingly, in an embodiment of the present disclosure, the light source 11 and the light source optical system 13 of the first light source unit LS1 are shifted toward the plane B and the light source 11 and the light source optical system 13 of the second light source unit LS2 are shifted toward the plane A. FIGS. 8 and 9 illustrate the arrangement described above, and the arrangements are similar to the arrangements in FIGS. 6 and 7. In FIGS. 8 and 9, a position shifted from the plane A by +d/2 and from the plane B by −d/2 is indicated by a two-dot chain line as an intermediate position O. In FIG. 8, the light source 11 of the first light source unit LS1, the light source 11 of the second light source unit LS2, and the light source optical systems 13 are arranged so as to coincide with the intermediate position O. and these optical axes are disposed between the plane A and the plane B. As described above, the focal point of the first condensing optical system 16 coincides with the brightest position of the first irradiation spot 51 on the wavelength converter 17. Thus, when a parallel light beam is incident on the light source optical system 13, the brightest position (i.e., the spot center) of the first irradiation spot 51 is formed at the focal position, so that the positions of the light source 11 and the light source optical system 13 can be shifted in the Z-direction as long as the light source 11 and the light source optical system 13 are within the aperture of a lens of the first condensing optical system 16.

In at least some embodiments, in the illumination device, a light beam emitted from the light source unit and another light beam emitted from said another light source unit are between the plane A and the plane B in the perpendicular direction.

In an embodiment of the present disclosure, by utilizing the lens characteristics of the first condensing optical system 16, the position of the center of the light source 11 of the first light source unit LS1 or the position of the optical axis of the light source optical system 13 is controlled so that a light beam A1 emitted from the light source optical system 13 of the first light source unit LS1 is disposed between the plane A and the plane B. In the case where the light beam A1 is disposed between the plane A and the plane B, the principal ray (i.e., substantially center) of the light beam A1 is disposed between the plane A and the plane B. When the gap between the plane A and the plane B is narrower than the light beam A1, most of the light beam A1 is disposed between the plane A and the plane B. Similarly, the position of the center of the light source 11 of the second light source unit LS2 or the position of the optical axis of the light source optical system 13 is controlled so that the light beam B1 emitted from the light source optical system 13 of the second light source unit LS2 is disposed between the plane A and the plane B. The term "controlled" indicates that the position of the optical axis or the position of the center of the light source 11 is assigned, and is not limited to movability, for example, a drive mechanism. In the case where the light beam B1 is disposed between the plane A and the plane B, the principal ray (i.e., substantially center) of the light beam is disposed between the plane A and the plane B. In other words, when the gap between the plane A and the plane B is narrower than the light beam B1, most of the light beam B1 is disposed between the plane A and the plane B. Further, in an embodiment of the present disclosure, the optical axes are arranged so as to coincide with the intermediate position O, but in order to reduce the size of the illumination device 10, it is sufficient to reduce the gap d in the height direction between the first light source unit LS1 and the second light source unit LS2, so that the optical axis of the light source optical system 13 is disposed between the plane A and the plane B.

In at least some embodiments, in the illumination device, the light source unit includes a condensing element having an optical axis, said another light source unit includes another condensing element having another optical axis, and the optical axis and said another optical axis are at a center between the plane A and the plane B in the perpendicular direction.

In at least some embodiments, in the illumination device, the center of the light source and said another center of said another light source are at a center of a space between the plane A and the plane B in the perpendicular direction.

According to the configuration described above, the gap d in the height direction between the light source unit LS1 and the second light source unit LS2 is reduced by changing the positions of the light source 11 and the light source optical system 13 without changing the positions of the first irradiation spot 51 and the second irradiation spot 52, and thus without changing the light intensity distribution at the entrance of the rod integrator 3, so that the size of the illuminating device 10 can be reduced while maintaining optical performance.

In order to reduce the size of the illumination device 10 described above, it is preferable that the gap d is minimized, and it is more preferable that the center position of the light source 11 of the first light source unit LS1 and the center position of the light source 11 of the second light source unit LS2 are located at substantially the same height. Similarly, in such a configuration, it is more preferable that the position of the optical axis of the light source optical system 13 of the first light source unit LS1 and the position of the optical axis of the light source optical system 13 of the second light source unit LS2 are disposed at substantially the same height. According to such a configuration, since the gap d in the height direction of the light source 11 between the first light source unit LS1 and the second light source unit LS2 is maintained to be smaller, the size of the illumination device 10 can be reduced while maintaining optical performance.

In at least some embodiments, in the illumination device, the light beam emitted from the light source unit and said another light beam emitted from said another light source unit are at an identical position in the perpendicular direction.

Further, the reduction of the gap d is equivalent to disposing the position of the light beam A1 emitted from the light source optical system 13 of the first light source unit LS1 and the position of the light beam B1 emitted from the light source optical system 13 of the second light source unit LS2 at substantially the same position in the Z-direction (i.e., the height direction). In the configuration described above, since the gap d in the height direction of the light source 11 between the first light source unit LS1 and the second light source unit LS2 is maintained to be smaller, the size of the illumination device 10) can be reduced while maintaining optical performance.

The plane A and the plane B are defined as described above, and the center position of the light source 11 and the position of the optical axis of the light source optical system 13 are shifted toward the intermediate position O between the plane A and the plane B within a region between the plane A and the plane B. As a result, the illumination device 10 is reduced in size without changing the position of the first irradiation spot 51 on the wavelength converter 17 in a diameter direction due to a lens effect of the light source optical system 13.

As described above, by moving the position of the optical axis of the light source optical system 13 so as to coincide with the intermediate position O, the gap d of the light source 11 between the first light source unit LS1 and the second light source unit LS2 can be minimized, and the size of the illumination device 10 can be reduced.

In at least some embodiments, in the illumination device, at least one of an optical axis of the light source or an optical axis of said another light source are in a space between the plane A and the plane B in the perpendicular direction.

Figure 10:
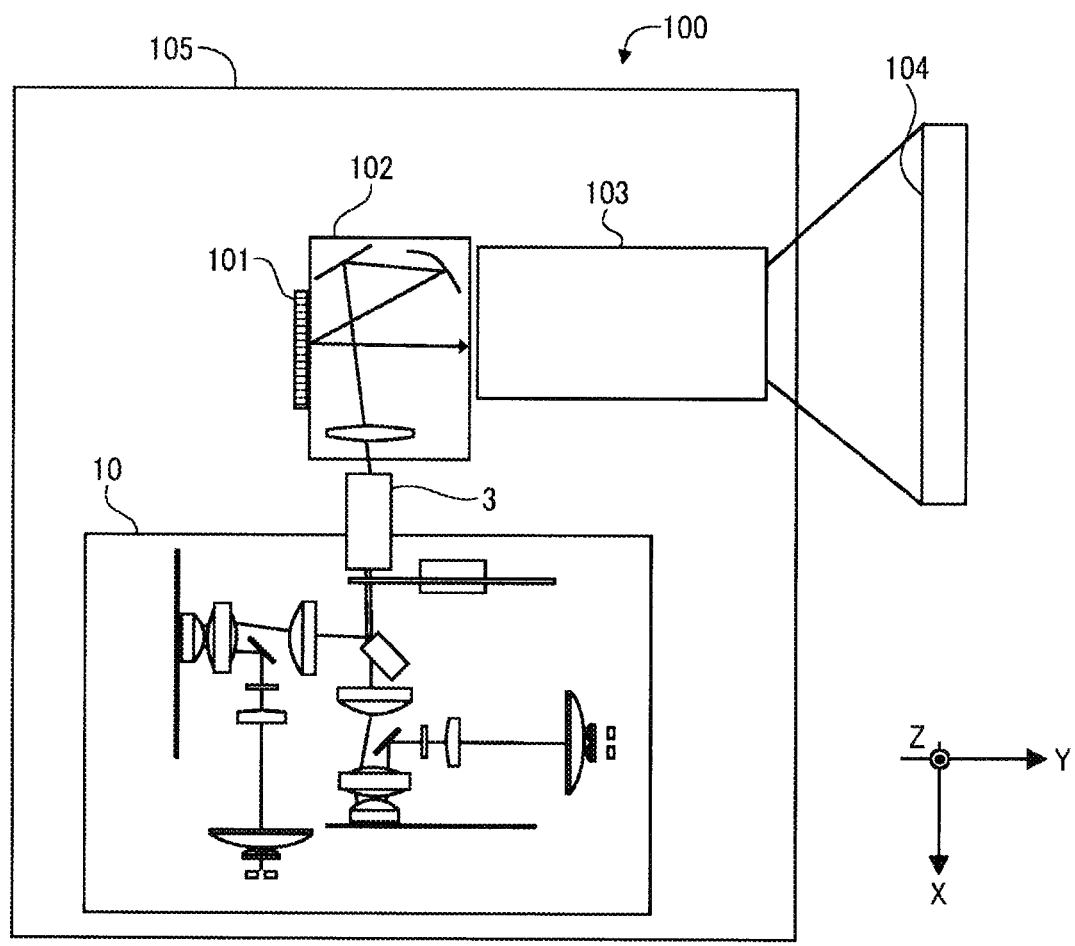
FIG. 10 is a diagram illustrating a configuration of an image projection apparatus, according to a second embodiment of the present disclosure.
Figure 11:
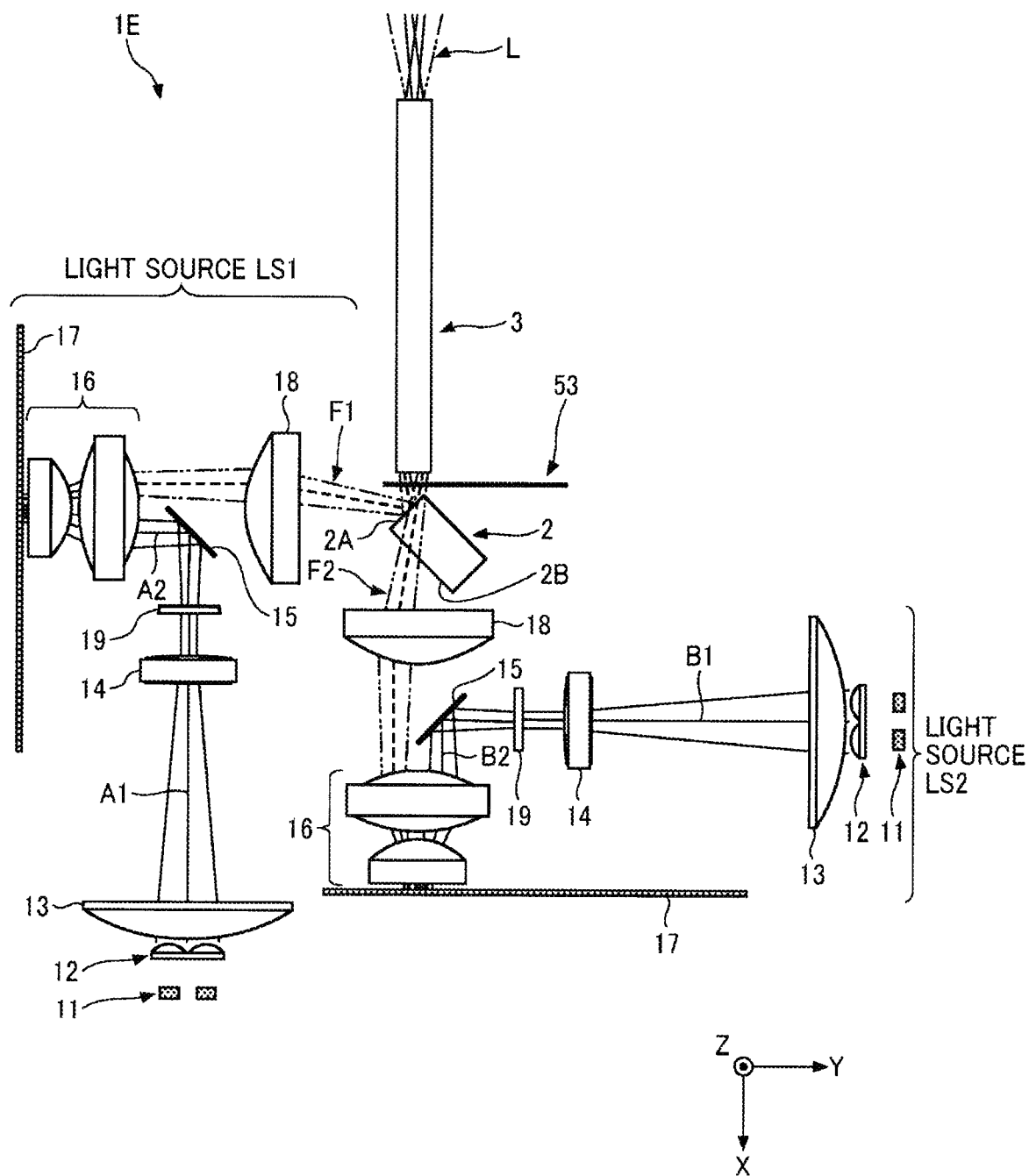
FIG. 11 is a schematic diagram of a configuration of an illumination device.

The illumination device 10 described above as a second embodiment of the present disclosure, an image projection apparatus 100 is schematically illustrated in FIG. 10. FIG. 11 is a schematic plan view of the illumination device 10 (as viewed from the top of the illumination device 10). Similar to the first embodiment of the present disclosure, the illumination device 10 includes a first light source unit LS1, a second light source unit LS2, a prism 2 as a light combiner, a color wheel 53, and a rod integrator 3 as a light homogenizer. Also, in an embodiment of the present disclosure, since optical elements such as a light source 11, a collimator lens 12, a light source optical system 13, a light condensing element 14, and a dichroic mirror 15, which are elements of the first light source unit LS1 and the second light source unit LS2, are common to each other, the same reference numerals are assigned to the elements, and description thereof is appropriately omitted. The wavelength converter 17 (the phosphor wheel) having a disk shape, a first condensing optical system 16, and a second condensing optical system 18 have the same configuration and are denoted by the same reference numerals and description thereof is omitted.

In at least some embodiments, an image projection apparatus includes: the illumination device: and an image generator to generate an image from a light beam emitted from the illumination device.

Figure 12:
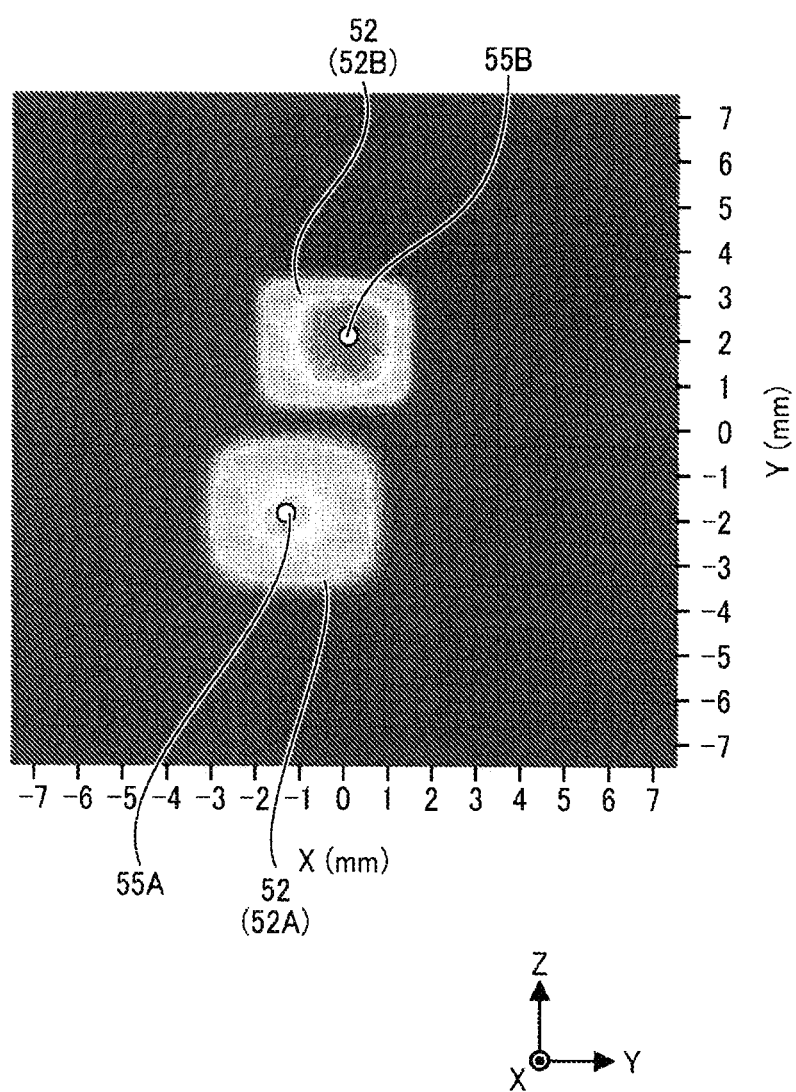
FIG. 12 is a diagram illustrating second irradiation spots of light source units according to an embodiment of the present disclosure.

In the illumination device 10 according to an embodiment of the present disclosure, second irradiation spots 52 condensed by the second condensing optical systems 18 of the first light source unit LS1 and the second light source unit LS2 are formed at the entrance of the rod integrator 3. FIG. 12 is a view of the second irradiation spots of the light source units formed at the entrance of the rod integrator 3. In FIG. 12, the second irradiation spot 52A is formed by the light beam F1 from the first light source unit LS1, and the second irradiation spot 52B is formed by the light beam F2 from the second light source unit LS2.

The second irradiation spot 52 is a region in which the light beam from each of the first light source unit LS1 and the second light source unit LS2 is condensed, and a position in which the light intensity distribution is the brightest (i.e., the light intensity is the highest) is determined when the light intensity distribution is measured. In the beam optical system, such spots may be referred to as the spot center 55 of the second irradiation spot 52. For example, when a light intensity distribution of the second irradiation spot 52 in FIG. 12, which is a cross section of a light beam, is measured and displayed as a two-dimensional image, a beam profile image is obtained. In the beam profile image, when the brightest point is specified, the spot center 55A and the spot center 55B described above can be obtained.

As illustrated in FIG. 12, in an embodiment of the present disclosure, the second irradiation spot 52A of the light beam F1 of the first light source unit LS1 and the second irradiation spot 52B of the light beam F2 of the second light source unit LS2 do not overlap each other at the entrance of the rod integrator 3. As a result, the illuminance at the entrance of the rod integrator 3 can be homogenized in a wide range as much as possible, and an illumination light beam irradiated to the DMD 101 can be well homogenized.

Further, the first light source unit LS1 and the second light source unit LS2 are typically arranged in parallel with the X-direction that is the longitudinal direction of the rod integrator 3. As a result, coupling having higher efficiency can be achieved with respect to the longitudinal direction of the rod integrator 3.

The first light source unit LS1 and the second light source unit LS2 are arranged in a configuration so that the first light source unit LS1 and the second light source unit LS2 are arranged in parallel with the longitudinal direction (i.e., the X-direction) of the rod integrator 3 and the second irradiation spot 52A of the light beam F1 and the second irradiation spot 52B of the light beam F2 are not overlapped with each other. In other words, the first light source unit LS1 and the second light source unit LS2 are arranged in an uneven manner (an uneven arrangement) with a gap formed in the vertical direction (i.e., Z-direction).

Figure 13:
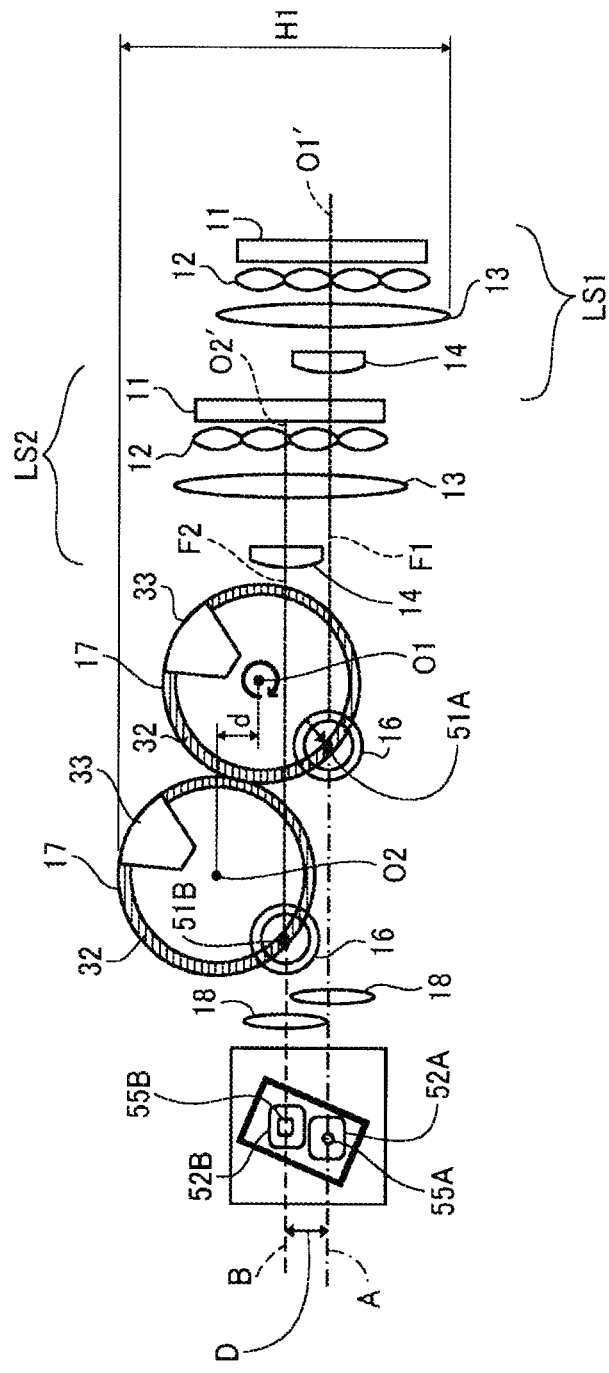
FIG. 13 is a diagram schematically illustrating optical paths to a rod integrator of light source units in a typical configuration.

FIG. 13 is a diagram schematically illustrating optical paths to the rod integrator 3 of the first light source unit and the second light source unit in a typical configuration in which the first light source unit LS1 and the second light source unit LS2 are arranged in the uneven arrangement.

Figure 14:
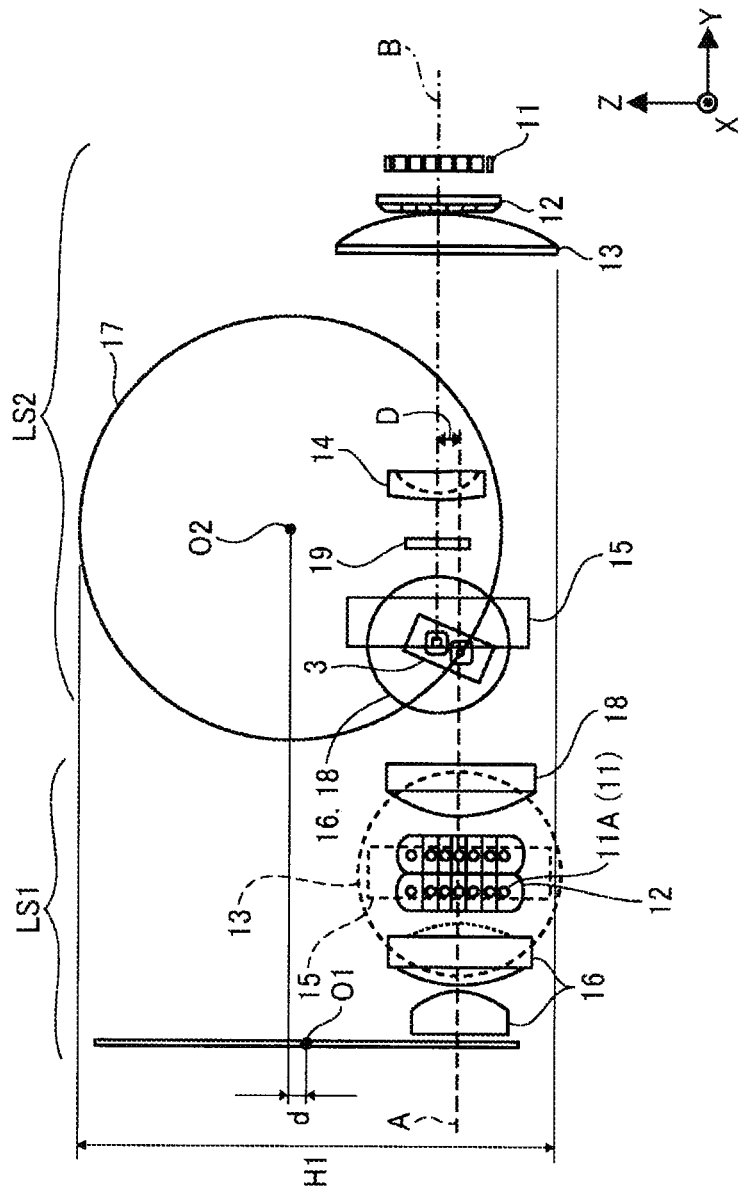
FIG. 14 is a schematic diagram of an illumination device of a typical configuration as viewed from the −X-direction.

FIG. 14 is a schematic diagram of the illumination device of the typical configuration as viewed from the −X-direction. FIG. 13 is merely a diagram schematically illustrating an optical path of each light source unit, and the size relation of the optical element, the phosphor wheel, and the optical elements differs from the actual one.

In order to represent the gap between the first light source unit LS1 and the second light source unit LS2 in the uneven arrangement as illustrated in FIGS. 13 and 14, virtual planes are introduced in the following description. With respect to the light beam F1 from the first light source unit LS1 in which the light beam F1 is reflected by the reflection surface 2A of the prism 2 and enters the rod integrator 3, a plane A (i.e., a virtual plane) is introduced in the following description. In other words, in the first light source unit LS1, a plane which includes the brightest positions (i.e., the spot center) of each irradiation spot of the first irradiation spot 51 and the second irradiation spot 52 and is parallel to the optical path (in the X-direction) from the prism 2 to the rod integrator 3 is the plane A. The plane A is a plane that virtually drawn at a position drawn by a dash-dotted line in FIG. 13 and a dashed line in FIG. 14 when the optical path is cut off in the Y-Z plane.

With respect to the light beam F2 from the second light source unit LS2 that is transmitted through the transmission plane 2B of the prism 2 and enters the rod integrator 3, a plane B (i.e., a virtual plane) is introduced in the following description. In other words, as in the case of the first light source unit LS1, with respect to the light beam F2 from the second light source unit LS2, a plane including both the first irradiation spot 51 and the second irradiation spot 52 and parallel to the plane A is the plane B. The plane B is a plane that virtually drawn at a position drawn by a dashed line in FIG. 13 and a dash-dotted line in FIG. 14 when the optical path is cut off in the Y-Z plane.

In a typical configuration in which the first light source unit LS1 and the second light source unit LS2 illustrated in FIGS. 13 and 14 are arranged in the uneven arrangement, the phosphor wheel is also arranged in the uneven arrangement. Specifically, the phosphor wheel of the second light source unit LS2 is shifted upward by the distance D between the plane A and the plane B with respect to the phosphor wheel of the first light source unit LS1 in the arrangement. As a result, the distance d between the rotation center O1 of the phosphor wheel of the first light source unit LS1 and the rotation center O2 of the phosphor wheel of the second light source unit LS2 in the Z-direction is equivalent to the distance D between the plane A and the plane B (i.e., d=D).

Temperature of the wavelength converter 17 (i.e., the phosphor wheel) rises by light irradiation. Thus, by increasing the diameter of the phosphor wheel, a period not to be irradiated with the light beam is extended during rotation, and the temperature rise of the phosphor wheel is reduced. However, the wavelength converter 17 becomes larger than other optical elements of the light source unit. In an embodiment of the present disclosure, since the light output of the excitation light beam is the same in each light source unit, the diameter of the wavelength converter 17 (i.e., the phosphor wheel) of each light source unit is also the same from the aspect of cooling.

As described above, the size of the wavelength converter 17 (i.e., the phosphor wheel) becomes larger in diameter from the aspect of cooling, and the size of the wavelength converter 17 is larger than the other optical elements of the light source unit. The large size phosphor wheel gives a larger influence on the size of the light source unit. Thus, in a typical configuration illustrated in FIGS. 13 and 14, since the phosphor wheel of the second light source unit LS2 is shifted upward by the distance D between the plane A and the plane B with respect to the phosphor wheel of the first light source unit LS1 in the arrangement, the size of the illumination device 10 is increased in the Z-direction. Specifically, in the typical configuration, the phosphor wheel of the second light source unit LS2 is shifted upward by a distance D between the plane A and the plane B with respect to the phosphor wheel of the first light source unit LS1 in the arrangement. Thus, the phosphor wheel of the second light source unit LS2 protrudes upward from the phosphor wheel of the first light source unit by the distance D, and the size of the illumination device 10 in the Z-direction becomes larger by the distance D, resulting in an increase in the size of the device.

In an embodiment of the present disclosure, the distance d between the rotation center O1 of the phosphor wheel of the first light source unit LS1 and the rotation center O2 of the phosphor wheel of the second light source unit LS2 in the Z-direction is shorter than the distance D between the plane A and the plane B (i.e., d<D). The features of an embodiment of the present disclosure will be described below with reference to the drawings.

Figure 15:
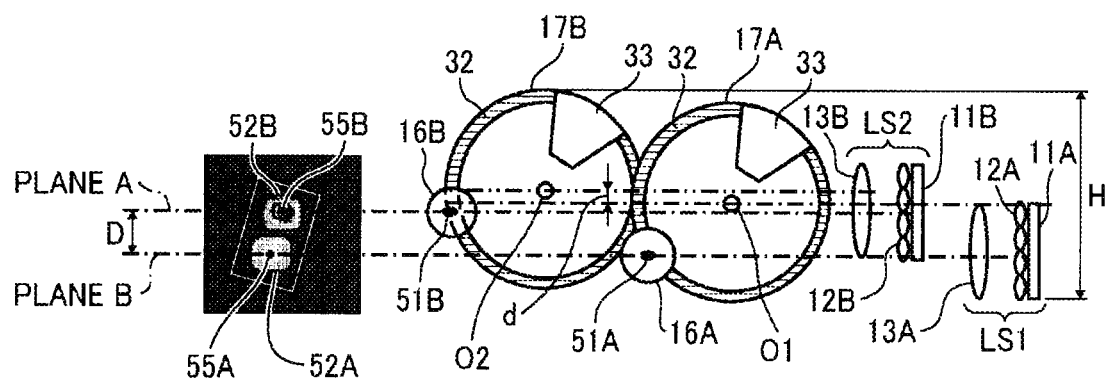
FIG. 15 is a diagram schematically illustrating optical paths to a rod integrator of light source units according to the present embodiment.

FIG. 15 is a diagram schematically illustrating the optical paths to a rod integrator 3 of light source unit LS1 and the light source unit LS2 according to an embodiment of the present disclosure. In FIG. 15, the light condensing element 14 and the second condensing optical system 18 are omitted. In the following description, the optical elements of the first light source unit LS1 are denoted by "A" after the reference numerals, and the optical elements of the second light source unit LS2 are denoted by "B" after the reference numerals.

As illustrated in FIG. 14, in an embodiment of the present disclosure, the phosphor wheel 17A and the phosphor wheel 17B are arranged so that the distance d is shorter than the distance D (i.e., d<D), where d is the distance between the rotation center O1 the phosphor wheel 17A of the first light source unit LS1 and the rotation center O2 of the phosphor wheel 17B of the second light source unit LS2 in the Z-direction, and D is the distance between the plane A and the plane B described above.

Accordingly: upward protruding of the phosphor wheel 17B of the second light source unit LS2 with respect to the phosphor wheel 17A of the second light source unit LS2 can be decreased as compared with the typical configuration (i.e., d=D) illustrated in FIG. 13. As a result, the size of the illumination device 10 in the vertical direction (i.e., Z-direction) can be shorter that the size of the typical configuration illustrated in FIG. 13, and the size of the device can be reduced.

Figure 16:
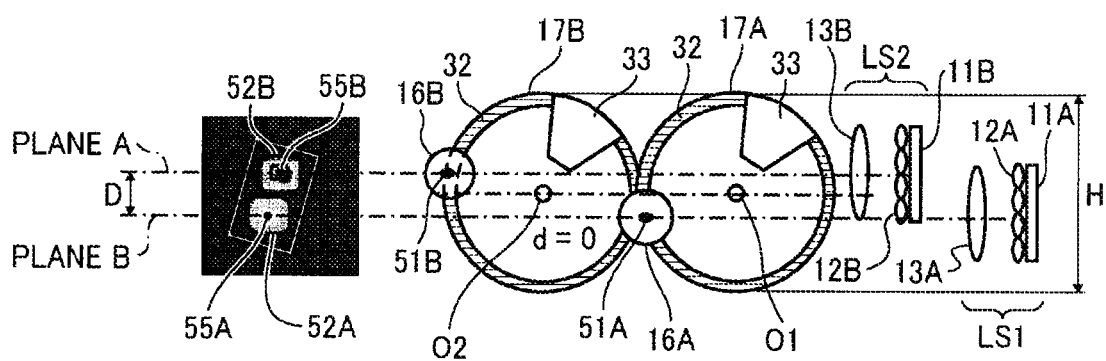
FIG. 16 is a schematic diagram in which a position of a rotation center of a phosphor wheel of a first light source unit in the Z-direction is the same as a position of a rotation center of a phosphor wheel of a second light source unit in the Z-direction.

As schematically illustrated in FIG. 16, the rotation center O1 of the phosphor wheel 17A of the first light source unit LS1 in the Z-direction and the rotation center O2 of the phosphor wheel 17B of the second light source unit LS2 in the Z-direction are arranged at the same position (d=0). As described above, in an embodiment of the present disclosure, the diameter of the phosphor wheel 17A of the first light source unit LS1 and the diameter of the phosphor wheel 17B of the second light source unit LS2 are the same. As a result, since the rotation center O1 of the phosphor wheel 17A and the rotation center O2 of the phosphor wheel 18B are arranged at the same position in the Z-direction, the upward protrusion of the phosphor wheel 17A from the phosphor wheel 17B (or the phosphor wheel 17B from the phosphor wheel 17A) can be eliminated. Accordingly, the size of the illumination device 10 in the vertical direction (i.e., the Z-direction) can be further reduced, and the size of the image projection apparatus can be further reduced.

In at least some embodiments, in the illumination device, a position of the rotation center and a position of said another rotation center are identical in the perpendicular direction.

Further, the configuration illustrated in FIG. 16, the rotation center O1 of the phosphor wheel 17A and the rotation center O2 of the phosphor wheel 17B are disposed between the plane A and the plane B in the Z-direction. As illustrated in FIG. 15, when the rotation center O1 of the phosphor wheels 17A and the rotation center O2 of the phosphor wheel 17B illustrated in FIG. 15 are arranged over the plane A in the Z-direction, the lower end of the light emitting portions 11A of the first light source unit LS1 is positioned below the lower end of the phosphor wheel 17A. As a result, the size of the illumination device 10 in the vertical direction (i.e., Z-direction) becomes larger than the diameter of the phosphor wheel.

By contrast, as illustrated in FIG. 16, in the configuration in which the rotation center O1 of the phosphor wheel 17A and the rotation center O2 of the phosphor wheel 17B are disposed between the plane A and the plane B in the Z-direction, the optical elements (i.e., the light source 11, the collimator lens 12, the light source optical system 13, the light condensing element 14, the dichroic mirror 15, the first condensing optical system 16, and the second condensing optical system 18) of each light source unit except for the phosphor wheel can be disposed between the lower end and the upper end of the phosphor wheel in the Z direction. Thus, a length H of the illumination device 10 in the vertical direction (i.e., the Z-direction) can be substantially equivalent to the diameter of the phosphor wheel, and the illumination device 10 can be reduced in size in the vertical direction as compared with the configuration illustrated in FIG. 15.

Depending on, for example, the size of the optical element, even in the configuration illustrated in FIG. 16, the optical element cannot be disposed between the lower end and the upper end of the phosphor wheel. Even in this case, as compared with the configuration illustrated in FIG. 15, the protrusion of the optical element from the phosphor wheel in the Z-direction can be reduced. The size of the illumination device 10 in the Z-direction can be reduced as compared with the configuration illustrated in FIG. 15. In the configuration, the rotation center O1 of the phosphor wheel 17A and the rotation center O2 of the phosphor wheel 17B are disposed outside of the space between the plane A and the plane B in the Z-direction.

In at least some embodiments, in the illumination device, the rotation center and said another rotation center are outside a space between the plane A and the plane B in the perpendicular direction.

In particular, in the configuration illustrated in FIG. 16, the phosphor wheel 17A and the phosphor wheel 17B are arranged so that the rotation center O1 of the phosphor wheel 17A and the rotation center O2 of the phosphor wheel 17B are disposed at the center between the plane A and the plane B. As a result, the optical elements (i.e., the light source 11, the collimator lens 12, the light source optical system 13, the light condensing element 14, the dichroic mirror 15, the first condensing optical system 16, and the second condensing optical system 18) of the light source units except for the phosphor wheels can be disposed near the rotation center of the rotation of the phosphor wheel in the vertical direction (i.e., Z-direction). Thus, the optical elements (i.e., the light source 11, the collimator lens 12, the light source optical system 13, the light condensing element 14, the dichroic mirror 15, the first condensing optical system 16 and the second condensing optical system 18) of each light source unit except for the phosphor wheel can be easily disposed between the lower end and the upper end of the phosphor wheel in the Z-direction, and the size of the illuminating device 10 can be reduced.

By disposing the rotation center O1 of the phosphor wheel 17A and the rotation center O2 of the phosphor wheel 17B over (see FIG. 15) or under the space between the plane A and the plane B in the Z-direction, the following advantages can be obtained. In the Z-direction, a space can be obtained at the opposite side of the rotation center O1 of the phosphor wheel 17A and the rotation center O2 of the phosphor wheel 17B (e.g., at the lower side in FIG. 15). Accordingly, other large components such as a cooling unit can be disposed in the space, and the degree of freedom in the layout of the apparatus can be increased.

Further, the phosphor wheel 17A and the phosphor wheel 17B may be disposed so that the lower ends of the phosphor wheel 17A and the phosphor wheel 17B are disposed at the same position as the lowest position of the optical elements other than the phosphor wheel 17A and the phosphor wheel 17B (the lower end of the light emitting portions 11A or the light source optical system 13A serving as the light source of the first light source unit in FIG. 16). If the configuration described above is applied, a length H of the illumination device 10 in the vertical direction (i.e., the Z-direction) can be substantially equivalent to the diameter of the phosphor wheel.

In the above description, the diameter of the phosphor wheel 17A of the first light source unit LS1 and the diameter of the phosphor wheel 17B of the second light source unit LS2 are the same. However, in the case where the diameter of the phosphor wheel 17A of the first light source unit LS1 and the diameter of the phosphor wheel 17B of the second light source unit LS2 are different from each other, the size of the device can be reduced by satisfying a relation of d<D as compared with the case of d≥D. In the case where a first phosphor wheel has a larger diameter L1, a second phosphor wheel as a smaller diameter L2, and a center-to-center distance d is between a rotation center of the first phosphor wheel and a rotation center of the second phosphor wheel, if L1−L2>d, the second phosphor wheel does not protrude from the first phosphor wheel. When d<D, the relation of L1−L2>d is satisfied, and the size increase in the illumination device 10 can be prevented.

Figure 17:
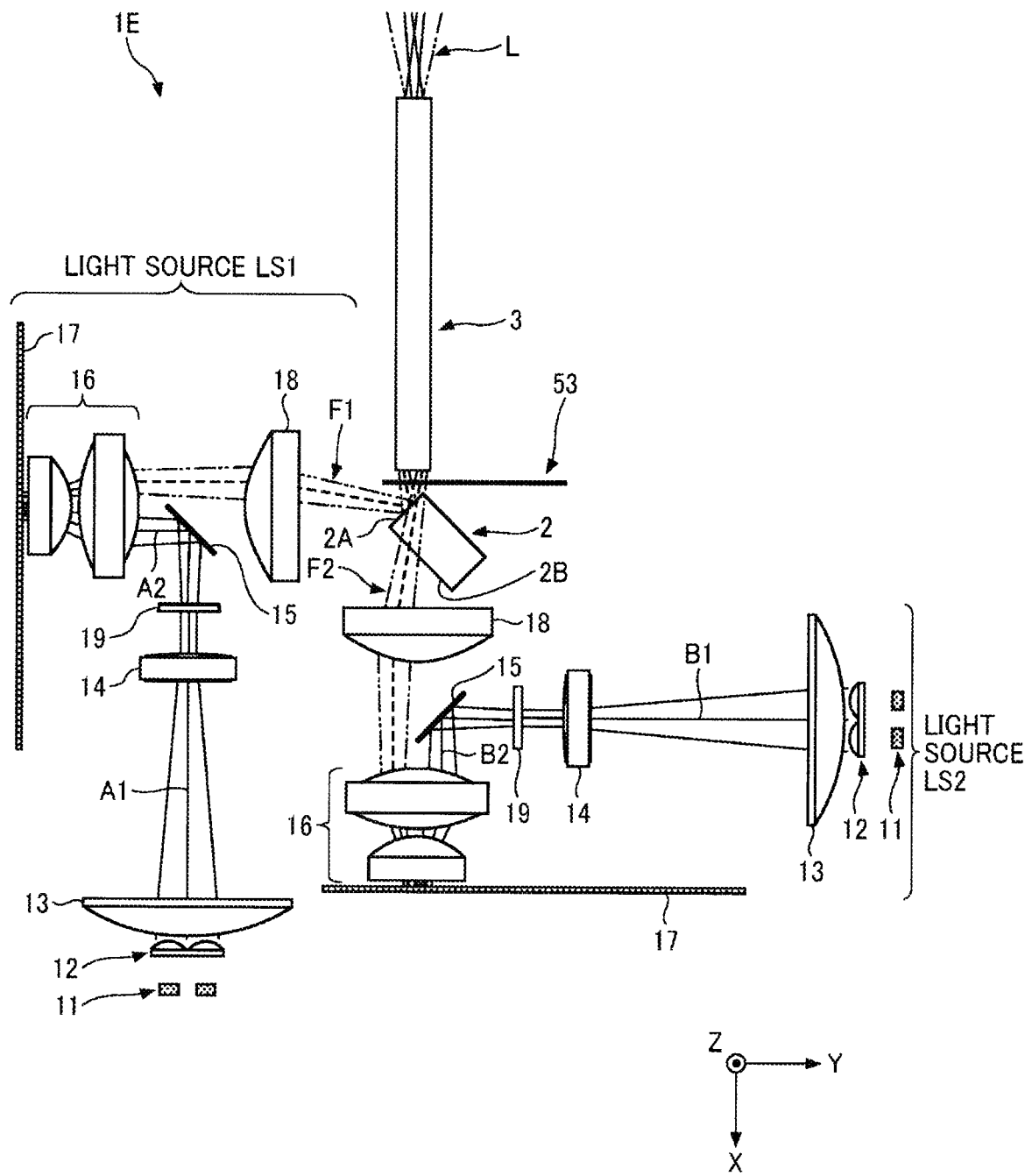
FIG. 17 is a diagram illustrating a configuration of an illumination device, according to a third embodiment of the present disclosure.

Further, as a third embodiment of the present disclosure, a configuration that satisfies a relation of D>d is illustrated in FIG. 17, where d is a distance between the optical elements of the first light source unit LS1 and the optical elements of the second light source unit LS2.

In at least some embodiments, an illumination device includes: a light source unit including: a light source to emit a light beam: and a wavelength converter rotatable to convert a wavelength of the light beam: another light source unit including: another light source to emit another light beam: and another wavelength converter rotatable to convert another wavelength of said another light beam: a light homogenizer to homogenize the light beam and said another light beam: and a light combiner to: bend the light beam to guide the light beam into the light homogenizer in one direction, and guide said another light beam into the light homogenizer in a another direction parallel to said one direction. A relation below is satisfied: D>d, where: D is a distance between a plane A and a plane B in a perpendicular direction perpendicular to the plane A. and d is a distance between a rotation center of the wavelength converter and another rotation center of said another wavelength converter, or between a center of the light source and another center of said another light source, in the perpendicular direction. The plane A is a plane including: a position of a brightest irradiation spot on the wavelength converter: and a position of a brightest irradiation spot on the light homogenizer. The plane A is parallel to an optical path of the light beam incident on the light homogenizer, and the plane B is a plane including: a position of a brightest irradiation spot on said another wavelength converter: and a position of a brightest irradiation spot on the light homogenizer. The plane B is parallel to the plane A.

In at least some embodiments, in the illumination device, the wavelength converter and said another wavelength converter have a relation of: D>d, where d is a distance between the rotation center of the wavelength converter and said another rotation center of said another wavelength converter in the perpendicular direction.

In at least some embodiments, in the illumination device, the light source and said another light source has a relation of: D>d, where d is a distance between the center of the light source and said another center of said another light source.

Also, in an embodiment of the present disclosure, in the first light source unit LS1 and the second light source unit LS2, the light beam emitted from the light source 11 propagates to the phosphor wheel 17 via the collimator lens 12, the light source optical system 13, the condensing element 14, the dichroic mirror 15, and the first condensing optical system 16, which are optical elements of the first light source unit LS1 and the second light source unit LS2. The light beam whose wavelength is converted by the phosphor wheel 17 again passes through the first condensing optical system 16, the phosphor wheel 17 and the second condensing optical system 18, and is incident on the rod integrator 3. Since the first light source unit LS1 and the second light source unit LS2 respectively have different optical axes, at least one of the light beam from the first light source unit LS1 or the light beam from the second light source unit LS2 is changed in the direction to guide the light beam and the light beam to the light homogenizer. In FIG. 17, a prism 2 is employed as a light combiner for changing the direction of the optical axis of the first light source unit LS1. The light combiner is not limited to such a prism, and the optical path may be bent by a diffraction grating or a cuneate prism or may be bent by reflection.

Figure 18:
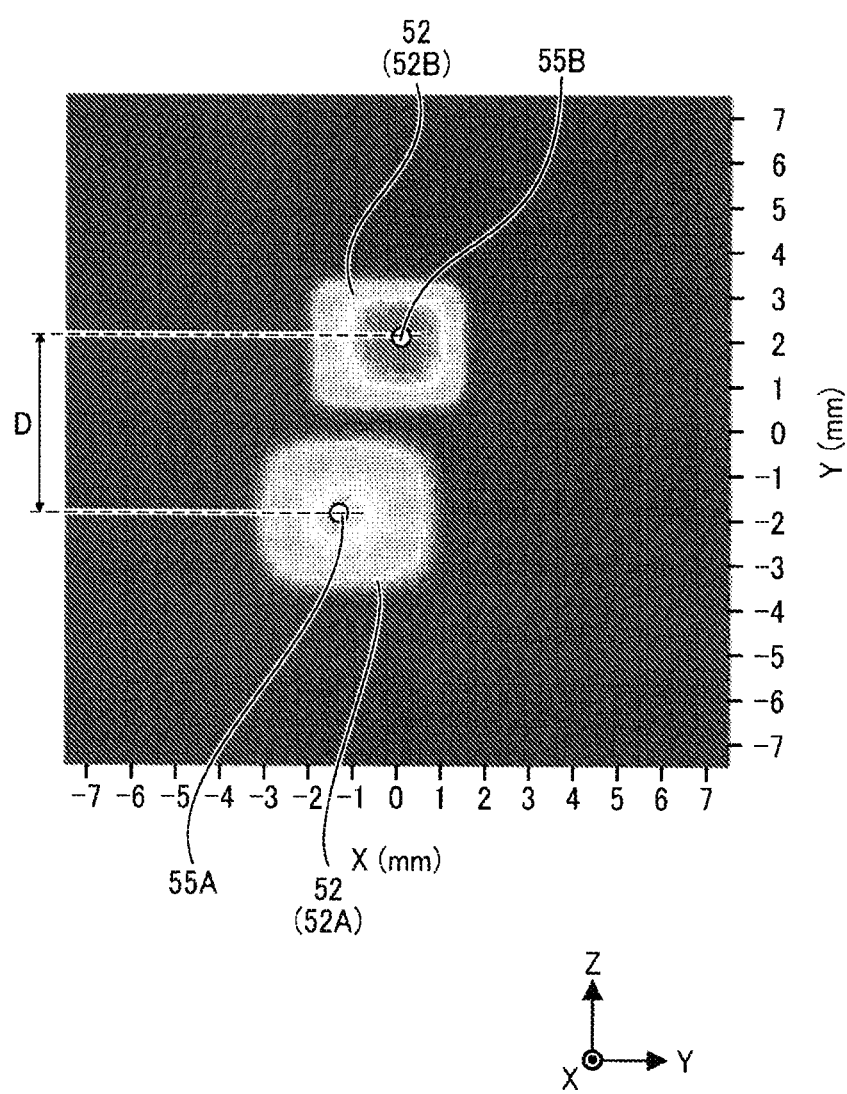
FIG. 18 is a diagram illustrating second irradiation spots by light source units, according to an embodiment of the present disclosure.

As described above, examples of the optical elements of the first light source unit LS1 and the second light source unit LS2 include the light source 11, the collimator lens 12 arranged opposite to the light source 11, the light source optical system 13, the light condensing element 14, and the wavelength converter 17 (i.e., the phosphor wheel). In an embodiment of the present disclosure, in the configuration in which two light source units are used, the size of the main body of the image projection apparatus 100 is decreased depending on the arrangement of the first light source unit LS1 and the second light source unit LS2. In particular, with respect to the size of the main body in the height direction (i.e., Z-direction in FIG. 17), an increase in size can be reduced by bringing the height of the optical elements in the optical path from the light source 11 to the rod integrator 3 closer to each other. In an embodiment of the present disclosure, FIG. 18 illustrates irradiation spots of the light beams on the wavelength converter 17 (the phosphor wheel). In FIG. 18, the horizontal axis is the Y-direction, the vertical axis is the Z-direction, and the spot center 55A and the spot center 55B are arranged in the Z-direction.

The first light source unit LS1 and the second light source unit LS2 are arranged by satisfying the relation of D>d, increase in the device size is prevented, where D is the distance between the spot center 55A and the spot center 55B in the height direction in FIG. 18, and d is the center-to-center distance between the components (e.g., the light source or the optical elements) in the optical path from first light source unit LS1 to the rod integrator and the components (e.g., the light source or the optical elements) in the optical path from second light source unit LS2 to the rod integrator.

The optical element achieving a closer center-to-center distance d may be any element among the optical elements in the first light source unit LS1 and the second light source unit LS2 and is not specified. However, when the optical element is the wavelength converter 17 (i.e., the phosphor wheel), which is a relatively large elements, or the light source 11 to which a larger cooling device is attached, it is more effective to reduce the size of the image projection apparatus 110 by closing the center-to-center distance.

Aspects of the present disclosure are as follows, for example.

In a first aspect, an illumination device includes: at least two light source units (i.e., a first light source unit and a second light source unit): and a prism 2. In the at least two light sources, a light source unit (e.g., a first light source unit LS1) and another light source unit (e.g., a second light source unit LS2) respectively include a light source 11 and a wavelength converter 17. The wavelength converter 17 is rotatably arranged and convers a wavelength of a light beam emitted from the light source. The prism 2 deflects a light beam emitted from at least one of the first light source unit LS1 or the second light source unit LS2, aligns a direction of the light beam emitted from the first light source unit LS1 and a direction of the light beam emitted from the second light source unit LS2, and guides the light beams to a light homogenizer such as a rod integrator 3.

In the illumination device, a relation of D>d is satisfied, where D is a distance between a plane A and a plane B in a perpendicular direction perpendicular to the plane A, and d is a distance between a component of the first light source unit LS1 and a component of the second light source unit in the perpendicular direction. The plane A includes a brightest spot formed on the wavelength converter 17 and a brightest spot formed on the rod integrator 3 by the first light source unit LS1, and is parallel to an optical path to the rod integrator 3. The plane B is parallel to the first plan and includes a brightest spot formed on the wavelength converter 17 and a brightest spot formed on the rod integrator 3 by the second light source unit LS2.

As a result, the configuration described above can prevent the illumination device from increasing the size, in particular, in the height direction, by closing the optical components in the optical path from the light source 11 and the rod integrator 3.

In a second aspect, in the illumination device according to the first aspect, the prism has a reflection surface as a reflection portion to reflect at least one of the light beams from the first light source unit LS1 or the second light source unit LS2. Accordingly, the light beams from the two light source units are guided to substantially the same direction and enter the light homogenizer such as rod integrator.

As a result, the configuration described above enables the light beams emitted from the two light sources (the light source unit LS1 and light source unit LS2) to be parallel.

In a third aspect, in the illumination device according to the first or second aspect, the wavelength converter 17 is arranged so to satisfy a relation of D>d, where d is a distance between a rotation center of the wavelength converter 17 of the light source unit (e.g., the first light source unit LS1) and a rotation center of the wavelength converter 17 of said another light source unit (e.g., the second light source unit LS2).

As a result, the configuration described above can prevent the image projection apparatus 100 from increasing the size, in particular, in the height direction (i.e., the Z-direction in FIG. 16) by reducing the difference of the rotation center of the wavelength converter (phosphor wheel 17) that is the biggest component in the path from the light source 11 to the rod integrator 3.

In a fourth aspect, in the illumination device according any one of the first to the third aspects, the rotation center O1 of the wavelength converter (the phosphor wheel 17A) of the light source unit (e.g., the first light source unit LS1) and the rotation center O2 of the wavelength converter (the phosphor wheel 17B) of said another light source unit (e.g., the second light source unit LS2) are disposed outside of an space between the plane A and the plane B.

According to the configuration, in an embodiment of the present disclosure as described above, a space can be generated at a position opposite to the position of, for example, the rotation center of the wavelength converter of the light source unit. As a result, a larger component such as a cooling device can be arranged at the space. In other words, a degree of freedom on the layout of the device can be increased.

In a fifth aspect, in the illumination device according to the first to fourth aspects, the rotation center O1 of the wavelength converter (the phosphor wheel 17A) of the light source unit (e.g., the first light source unit LS1) and the rotation center O2 of the wavelength converter (the phosphor wheel 17B) of said another light source unit (e.g., the second light source unit LS2) are the same position in the perpendicular direction perpendicular to the plane A. In other words, the perpendicular direction is the Z-direction or the up-down direction.

According to the configuration, as described in FIG. 7, the illumination device can be reduced in size in perpendicular direction as compared with the case where the rotation center O1 of the wavelength converter (the phosphor wheel 17A) of the light source unit and the rotation center O2 of the wavelength converter (the phosphor wheel 17B) of said another light source unit are different from each other.

In a sixth aspect, in the illumination device according any one of the first to fifth aspects, the light source 11 of the light source unit (e.g., the first light source unit LS1) and said another light source 11 of said another light source unit (e.g., the second light source unit LS2) are arranged so to satisfy a relation of D>d, where d is a distance between the center of the light source 11 and said another center of the light source 11.

According to the configuration described above, the image projection apparatus 100 can be reduced in size by reducing the height of the center position of the light source 11 in each component in the optical path from the light source 11 to the rod integrator 3.

In a seventh aspect, in the illumination device according to any one of the first to sixth aspect, at least one of an optical path of the light source unit (e.g., the first light source unit LS1) or an optical path of said another light source unit (e.g., the second light source unit LS2) are arranged at a space between the plane A and the plane B.

As a result, the configuration described above can prevent the illumination device from increasing the size by reducing the height in the first light source unit LS1 and the second light source unit LS2.

In an eighth aspect, the illumination device according to any one of the first to seventh aspects, a light beam emitted from the light source unit (e.g., the first light source unit LS1) and another light source beam emitted from said another light source unit (e.g., the second light source unit LS2) are arranged at the space between the plane A and the plane B.

Accordingly, since the height of the first light source unit LS1 and the second light source unit LS2 can be reduced in the height direction, and the illumination device can be reduced in size.

In a ninth aspect, in the illumination device according to any one of the first to eighth aspects, a perpendicular direction perpendicular the plane A is a height direction, and a light beam emitted from the light source unit (e.g., the first light source unit LS1) and another light beam emitted from said another light source unit (e.g., the second light source unit LS2) are arranged at substantially the same position in the height direction.

As a result, since the configuration described above enables the gap between the centers of the light sources of the first light source unit and the second light source unit in the height direction to be small, the illumination device can be reduced in size while maintaining the optical performance.

In a tenth aspect, in the illumination device according to any one of the first to ninth aspects, the light source unit (e.g., the first light source unit LS1) and said another light source unit (e.g., the second light source unit LS2) respectively include a light condensing element, and optical axes of the light condensing elements are arranged at the center between the plane A and the plane B.

As a result, since the configuration described above enables the gap between the center of the first light source unit LS1 and the center of the second light source unit LS2 in the height direction to be minimum, the illumination device can be reduced in size while maintaining the optical performance.

In an eleventh aspect, in the illumination device according to any one of the first to tenth aspects, the center of the light source of the light source unit (e.g., the first light source unit LS1) and the center of the light source of said another light source unit (e.g., the second light source unit) are arranged at the center between the plane A and the plane B.

As a result, since the configuration described above enables the gap between the center of the first light source unit LS1 and the center of the second light source unit LS2 in the height direction to be minimum, the illumination device can be reduced in size while maintaining the optical performance.

In a twelfth aspect, an image projection apparatus includes: the illumination device 10 according any one of the first to the eleventh aspects: and an image generator such as a DMD to generate an image using a light beam emitted from the illumination device.

As a result, the image projection device can be reduced in size.

Aspects of the present disclosure are as follows, for example.

In a thirteenth aspect, an illumination device includes: a light source unit including: a light source to emit a light beam: and a wavelength converter rotatable to convert a wavelength of the light beam: another light source unit including: another light source to emit another light beam: and another wavelength converter rotatable to convert another wavelength of said another light beam: a light homogenizer to homogenize the light beam and said another light beam: and a light combiner to: bend the light beam to guide the light beam into the light homogenizer in one direction, and guide said another light beam into the light homogenizer in a another direction parallel to said one direction. A relation below is satisfied: D>d, where: D is a distance between a plane A and a plane B in a perpendicular direction perpendicular to the plane A, and d is a distance between a rotation center of the wavelength converter and another rotation center of said another wavelength converter, or between a center of the light source and another center of said another light source, in the perpendicular direction. The plane A is a plane including: a position of a brightest irradiation spot on the wavelength converter: and a position of a brightest irradiation spot on the light homogenizer. The plane A is parallel to an optical path of the light beam incident on the light homogenizer, and the plane B is a plane including: a position of a brightest irradiation spot on said another wavelength converter: and a position of a brightest irradiation spot on the light homogenizer. The plane B is parallel to the plane A.

In a fourteenth aspect, in the illumination device according to the thirteenth aspect, the light combiner has a reflection portion to reflect the light beam from the light source unit to the light homogenizer.

In a fifteenth aspect, in the illumination device according to the thirteenth or fourteenth aspect, the wavelength converter and said another wavelength converter have a relation of: D>d, where d is a distance between the rotation center of the wavelength converter and said another rotation center of said another wavelength converter in the perpendicular direction.

In a sixteenth aspect, in the illumination device according to any one of the thirteenth or fifteenth aspects, the rotation center and said another rotation center are outside a space between the plane A and the plane B in the perpendicular direction.

In a seventeenth aspect, in the illumination device according to any one of the thirteenth aspect to sixteenth aspects, a position of the rotation center and a position of said another rotation center are identical in the perpendicular direction.

In an eighteenth aspect, in the illumination device according to any one of the thirteenth to seventeenth aspects, the light source and said another light source has a relation of: D>d, where d is a distance between the center of the light source and said another center of said another light source.

In a nineteenth aspect, in the illumination device according to any one of the thirteenth to eighteenth aspects, at least one of an optical axis of the light source or an optical axis of said another light source are in a space between the plane A and the plane B in the perpendicular direction.

In a twentieth aspect, in the illumination device according to any one of the thirteenth to nineteenth aspects, a light beam emitted from the light source unit and another light beam emitted from said another light source unit are between the plane A and the plane B in the perpendicular direction.

In a twenty-first, in the illumination device according to any one of the thirteenth to twentieth aspects, the light beam emitted from the light source unit and said another light beam emitted from said another light source unit are at an identical position in the perpendicular direction.

In a twenty-second aspect, in the illumination device according to any one of the thirteenth to twenty-first aspect, the light source unit includes a condensing element having an optical axis, said another light source unit includes another condensing element having another optical axis, and the optical axis and said another optical axis are at a center between the plane A and the plane B in the perpendicular direction.

In a twenty-third aspect, in the illumination device according to any one of the thirteenth to twenty-second aspects, the center of the light source and said another center of said another light source are at a center of a space between the plane A and the plane B in the perpendicular direction.

In a twenty-fourth aspect, an image projection apparatus includes: the illumination device according to the thirteenth to twenty-third aspects; and an image generator to generate an image from a light beam emitted from the illumination device.

The effects of the embodiments of the present disclosure described above are merely preferable effects resulting from the embodiments of the present disclosure The effects of the embodiments of the present disclosure are not limited to those described in the embodiments.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An illumination device comprising:
   a light source unit including:
     a light source to emit a light beam; and
     a wavelength converter rotatable to convert a wavelength of the light beam;
   another light source unit including:
     another light source to emit another light beam; and
     another wavelength converter rotatable to convert another wavelength of said another light beam;
   a light homogenizer to homogenize the light beam and said another light beam; and
   a light combiner to:
     bend the light beam to guide the light beam into the light homogenizer in one direction, and
     guide said another light beam into the light homogenizer in another direction parallel to said one direction,
   wherein a relation below is satisfied:

$D > d$ where:
   D is a distance between a plane A and a plane B in a perpendicular direction perpendicular to the plane A, and
   d is a distance between a rotation center of the wavelength converter and another rotation center of said another wavelength converter, or between a center of the light source and another center of said another light source, in the perpendicular direction,
   where:
   the plane A is a plane including:
     a position of a brightest irradiation spot on the wavelength converter; and
     a position of a brightest irradiation spot on the light homogenizer,
     wherein the plane A is parallel to an optical path of the light beam incident on the light homogenizer, and
   the plane B is a plane including:
     a position of a brightest irradiation spot on said another wavelength converter; and
     a position of a brightest irradiation spot on the light homogenizer,
     wherein the plane B is parallel to the plane A.

2. The illumination device according to claim 1, wherein the light combiner has a reflection portion to reflect the light beam from the light source unit to the light homogenizer.

3. The illumination device according to claim 1, wherein the wavelength converter and said another wavelength converter have a relation of:

$D > d$ where d is a distance between the rotation center of the wavelength converter and said another rotation center of said another wavelength converter in the perpendicular direction.

4. The illumination device according to claim 3, wherein the rotation center and said another rotation center are outside a space between the plane A and the plane B in the perpendicular direction.

5. The illumination device according to claim 3, wherein a position of the rotation center and a position of said another rotation center are identical in the perpendicular direction.

6. The illumination device according to claim 1, wherein the light source and said another light source has a relation of:

$D > d$ where d is a distance between the center of the light source and said another center of said another light source.

7. The illumination device according to claim 6, wherein at least one of an optical axis of the light source or an optical axis of said another light source are in a space between the plane A and the plane B in the perpendicular direction.

8. The illumination device according to claim 6, wherein a light beam emitted from the light source unit and another light beam emitted from said another light source unit are between the plane A and the plane B in the perpendicular direction.

9. The illumination device according to claim 6, wherein the light beam emitted from the light source unit and said another light beam emitted from said another light source unit are at an identical position in the perpendicular direction.

10. The illumination device according to claim 1, wherein the light source unit includes a condensing element having an optical axis, said another light source unit includes another condensing element having another optical axis, and the optical axis and said another optical axis are at a center between the plane A and the plane B in the perpendicular direction.

11. The illumination device according to claim 1,
wherein the center of the light source and said another center of said another light source are at a center of a space between the plane A and the plane B in the perpendicular direction.

12. An image projection apparatus comprising,
the illumination device according to claim 1; and
an image generator to generate an image from a light beam emitted from the illumination device.

\* \* \* \* \*